(12) United States Patent
Tanaka et al.

(10) Patent No.: US 11,745,767 B2
(45) Date of Patent: Sep. 5, 2023

(54) WORK MACHINE CONTROL SYSTEM, WORK MACHINE, AND WORK MACHINE CONTROL METHOD

(71) Applicant: Komatsu Ltd., Tokyo (JP)

(72) Inventors: Daisuke Tanaka, Tokyo (JP); Tatsuya Shiga, Tokyo (JP)

(73) Assignee: Komatsu Ltd., Tokyo (JP)

( * ) Notice: Subject to any disclaimer, the term of this patent is extended or adjusted under 35 U.S.C. 154(b) by 327 days.

(21) Appl. No.: 16/962,043

(22) PCT Filed: Feb. 5, 2019

(86) PCT No.: PCT/JP2019/004107
§ 371 (c)(1),
(2) Date: Jul. 14, 2020

(87) PCT Pub. No.: WO2019/187654
PCT Pub. Date: Oct. 3, 2019

(65) Prior Publication Data
US 2020/0391767 A1 Dec. 17, 2020

(30) Foreign Application Priority Data

Mar. 30, 2018 (JP) ................................. 2018-070026

(51) Int. Cl.
*B60W 60/00* (2020.01)
*G01C 21/00* (2006.01)
(Continued)

(52) U.S. Cl.
CPC ..... *B60W 60/0025* (2020.02); *G01C 21/3826* (2020.08); *G01C 21/3848* (2020.08);
(Continued)

(58) Field of Classification Search
None
See application file for complete search history.

(56) References Cited

U.S. PATENT DOCUMENTS

| 5,668,739 A | * | 9/1997 | League | G01S 13/726 |
| | | | | 342/159 |
| 8,755,606 B2 | * | 6/2014 | Yates | G06T 17/05 |
| | | | | 715/788 |

(Continued)

FOREIGN PATENT DOCUMENTS

| CN | 106371104 A | * | 2/2017 | ........... G01S 17/931 |
| DE | 102008041679 A1 | * | 3/2010 | ............. G01C 21/32 |

(Continued)

OTHER PUBLICATIONS

International Search Report dated Apr. 16, 2019, issued for PCT/JP2019/004107 and English translation thereof.

*Primary Examiner* — Jelani A Smith
*Assistant Examiner* — Jacob Daniel Underbakke
(74) *Attorney, Agent, or Firm* — Locke Lord LLP

(57) ABSTRACT

A work machine control system includes: a position sensor that detects the position of a work machine travelling on a traveling path; a non-contact sensor that detects the position of an object around the work machine; and a map data creation unit that creates map data on the basis of a detection point of the object and detection data of the position sensor, the detection point being detected by the non-contact sensor and satisfying a defined matching condition.

9 Claims, 16 Drawing Sheets

(51) Int. Cl.
    *G01S 17/89*     (2020.01)
    *G05D 1/02*      (2020.01)
    *G08G 1/017*     (2006.01)
    *G08G 1/0969*    (2006.01)
    *G01S 17/86*     (2020.01)
    *G01S 13/86*     (2006.01)
    *G01S 13/89*     (2006.01)

(52) U.S. Cl.
    CPC ............ *G01S 17/89* (2013.01); *G05D 1/0274* (2013.01); *G08G 1/017* (2013.01); *G08G 1/0969* (2013.01); *B60W 2300/12* (2013.01); *G01S 13/865* (2013.01); *G01S 13/89* (2013.01); *G01S 17/86* (2020.01); *G05D 2201/0202* (2013.01)

(56) References Cited

U.S. PATENT DOCUMENTS

| | | | |
|---|---|---|---|
| 9,869,555 | B2 | 1/2018 | Sakai et al. |
| 10,119,830 | B2 | 11/2018 | Sakai et al. |
| 10,260,892 | B2 | 4/2019 | Ichikawa et al. |
| 2012/0089292 | A1* | 4/2012 | Naimark ............... G05D 1/0274 |
| | | | 701/400 |
| 2013/0093613 | A1* | 4/2013 | Itoh ....................... G01S 13/345 |
| | | | 342/70 |
| 2013/0246020 | A1* | 9/2013 | Zeng ....................... G06F 30/20 |
| | | | 703/2 |
| 2016/0018511 | A1* | 1/2016 | Nayyar ..................... G01S 7/03 |
| | | | 342/27 |
| 2016/0357187 | A1* | 12/2016 | Ansari .................. G06T 19/003 |
| 2016/0363454 | A1* | 12/2016 | Hatanaka ............. G05D 1/0217 |
| 2017/0248439 | A1 | 8/2017 | Sakai et al. |
| 2017/0357858 | A1* | 12/2017 | Mendonca ............. G06V 20/56 |
| 2018/0020324 | A1* | 1/2018 | Beauford ............... H04W 4/025 |
| 2018/0292840 | A1 | 10/2018 | Sakai |

FOREIGN PATENT DOCUMENTS

| | | | | |
|---|---|---|---|---|
| JP | 06-273186 | A | | 9/1994 |
| JP | 2004-326264 | A | | 11/2004 |
| JP | 2009-169845 | A | | 7/2009 |
| JP | 2009169845 | | * | 7/2009 |
| JP | 2013061270 | | * | 4/2013 |
| JP | 2015138418 | | * | 7/2015 |
| JP | 2017-90958 | A | | 5/2017 |
| JP | 2017-194527 | A | | 10/2017 |
| JP | 2017-220264 | A | | 12/2017 |
| JP | 2018018215 | A | * | 2/2018 |
| WO | 2016/060281 | A1 | | 4/2016 |
| WO | 2016/117713 | A1 | | 7/2016 |
| WO | 2017/109977 | A1 | | 6/2017 |
| WO | WO-2018056231 | A1 | * | 3/2018 ............... G05D 1/02 |

* cited by examiner

[FIRST TRAVEL]

[SECOND TRAVEL]

[THIRD TRAVEL]

WORK MACHINE CONTROL SYSTEM, WORK MACHINE, AND WORK MACHINE CONTROL METHOD

FIELD

The present invention relates to a work machine control system, a work machine, and a work machine control method.

BACKGROUND

At a wide work site such as a mine, a work machine traveling unmanned may be used. The position of the work machine is detected using the global navigation satellite system (GNSS). When the detection accuracy of the global navigation satellite system decreases, the work machine may stop operating, and the productivity at the work site may decrease. Therefore, a technique of creating map data of a work site, collating detection data of a non-contact sensor with the map data when the detection accuracy of the global navigation satellite system decreases, and calculating the position of the work machine has been proposed.

CITATION LIST

Patent Literature

Patent Literature 1: WO 2016/060281 A

SUMMARY

Technical Problem

Map data is created on the basis of detection data of a non-contact sensor mounted on a work machine traveling on a traveling path. The non-contact sensor detects an object around the work machine, such as a bank on the traveling path. In creating the map data, the map data may include noise due to, for example, erroneous detection by the non-contact sensor. When the map data includes noise, the shape and position of an object indicated by the map data may deviate from the actual shape and position of the object due to the noise. As a result, when the detection data of the non-contact sensor is collated with the map data, the accuracy in position measurement of a work machine calculated may decrease.

An object of an aspect of the present invention is to create highly accurate map data.

Solution to Problem

According to an aspect of the present invention, a work machine control system comprises: a position sensor that detects a position of a work machine traveling on a traveling path; a non-contact sensor that detects a position of an object around the work machine; and a map data creation unit that creates map data on a basis of a detection point of the object and detection data of the position sensor, the detection point being detected by the non-contact sensor and satisfying a defined matching condition.

Advantageous Effects of Invention

According to an aspect of the present invention, highly accurate map data can be created.

DESCRIPTION OF EMBODIMENTS

Hereinafter, embodiments of the present invention will be described with reference to the drawings, but the present invention is not limited thereto. Components of the embodiments described below can be appropriately combined with each other. In some cases, some components are not used.

First Embodiment

[Management System]

Figure 1:
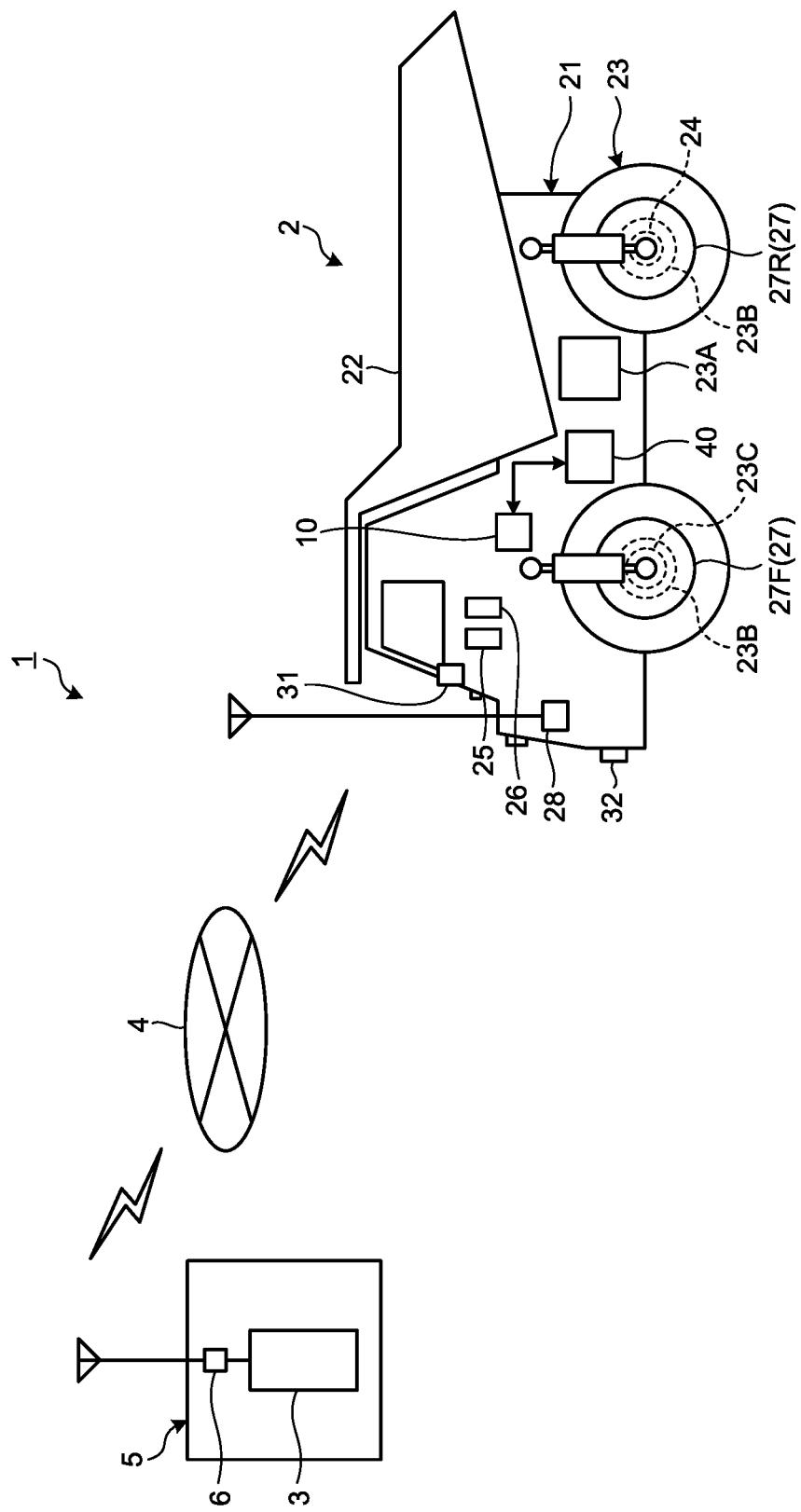
FIG. 1 is a diagram schematically exemplifying a management system and a work machine according to a first embodiment.

FIG. 1 is a diagram schematically exemplifying a management system 1 and a work machine 2 according to the present embodiment. The work machine 2 is an unmanned vehicle. The unmanned vehicle refers to a work vehicle that travels unmanned without driving operation by a driver. The work machine 2 travels on the basis of traveling condition data from the management system 1.

The work machine 2 operates at a work site. In the present embodiment, the work site is a mine or a quarry. The work machine 2 is a dump truck that travels at the work site and carries a load. The mine refers to a place or a business place where minerals are mined. The quarry refers to a place or a business place where stones are mined. Examples of the load carried by the work machine 2 include ore and earth and sand excavated in a mine or a quarry.

The management system 1 includes a management device 3 and a communication system 4. The management device 3 includes a computer system and is installed in a control facility 5 at the work site. An administrator exists in the control facility 5. The communication system 4 performs communication between the management device 3 and the work machine 2. A wireless communication device 6 is connected to the management device 3. The communication system 4 includes the wireless communication device 6. The management device 3 and the work machine 2 wirelessly communicate with each other via the communication system 4. The work machine 2 travels on a traveling path HL at the work site on the basis of traveling condition data transmitted from the management device 3.

[Work Machine]

The work machine 2 includes a main vehicle body 21, a dump body 22 supported by the main vehicle body 21, a traveling device 23 supporting the main vehicle body 21, a speed sensor 24, a direction sensor 25, an attitude sensor 26, a wireless communication device 28, a position sensor 31, a non-contact sensor 32, a data processing device 10, and a travel control device 40.

The main vehicle body 21 includes a vehicle body frame and supports the dump body 22. The dump body 22 is a member on which a load is loaded.

The traveling device 23 includes wheels 27 and travels on the traveling path HL. The wheels 27 include front wheels 27F and rear wheels 27R. Tires are attached to the wheels 27. The traveling device 23 includes a driving device 23A, a braking device 23B, and a steering device 23C.

The driving device 23A generates a driving force for accelerating the work machine 2. The driving device 23A includes an internal combustion engine such as a diesel engine. Note that the driving device 23A may include an electric motor. A driving force generated by the driving device 23A is transmitted to the rear wheels 27R, and the rear wheels 27R rotate. By the rotation of the rear wheels 27R, the work machine 2 travels by itself. The braking device 23B generates a braking force for decelerating or stopping the work machine 2. The steering device 23C can adjust a traveling direction of the work machine 2. The traveling direction of the work machine 2 includes the direction of a front part of the main vehicle body 21. The steering device 23C adjusts the traveling direction of the work machine 2 by steering the front wheels 27F.

The speed sensor 24 detects the traveling speed of the traveling device 23. Detection data of the speed sensor 24 includes traveling speed data indicating the traveling speed of the traveling device 23. The direction sensor 25 detects the direction of the work machine 2. The detection data of the direction sensor 25 includes direction data indicating the direction of the work machine 2. The direction of the work machine 2 is the traveling direction of the work machine 2. The direction sensor 25 includes a gyro sensor, for example. The attitude sensor 26 detects the attitude of the work machine 2. The attitude of the work machine 2 includes a tilt angle of the work machine 2 with respect to a horizontal plane. Detection data of the attitude sensor 26 includes attitude data indicating the attitude of the work machine 2. The attitude sensor 26 includes, for example, an inertial measurement unit (IMU).

The position sensor 31 detects the position of the work machine 2 traveling on the traveling path HL. The detection data of the position sensor 31 includes absolute position data indicating the absolute position of the work machine 2. The absolute position of the work machine 2 is detected using the global navigation satellite system (GNSS). The global navigation satellite system includes a global positioning system (GPS). The position sensor 31 includes a GPS receiver. The global navigation satellite system detects the absolute position of the work machine 2 defined by coordinate data of latitude, longitude, and altitude. The global navigation satellite system detects the absolute position of the work machine 2 defined in a global coordinate system. The global coordinate system refers to a coordinate system fixed to the earth.

The non-contact sensor 32 detects the position of an object around the work machine 2. The non-contact sensor 32 scans at least some of objects around the work machine 2 to detect a relative position with respect to a detection point DP of the object. Detection data of the non-contact sensor 32 includes relative position data indicating the relative position between the work machine 2 and the detection point DP. The non-contact sensor 32 is disposed, for example, in a lower front part of the main vehicle body 21. In a local coordinate system (vehicle body coordinate system) of the work machine 2, a relative position between an attachment position of the non-contact sensor 32 attached to the main vehicle body 21 and a reference point of the main vehicle body 21 is predetermined known data. The non-contact sensor 32 detects at least some of objects around the work machine 2 in a non-contact manner. An object around the work machine 2 includes an obstacle existing on the traveling path HL on which the work machine 2 travels, a rut on the traveling path HL, and an object with which the work machine 2 traveling on the traveling path HL may interfere, such as a bank BK (wall surface) existing beside the traveling path HL. The non-contact sensor 32 functions as an obstacle sensor that detects an obstacle in front of the work machine 2 in a non-contact manner.

The non-contact sensor 32 can detect a relative position between the work machine 2 and an object. The non-contact sensor 32 includes a laser sensor capable of scanning an object with a laser beam and detecting a relative position between the work machine 2 and each of a plurality of detection points DP of the object. Note that the non-contact sensor 32 may be a radar sensor capable of scanning an object with a radio wave and detecting a relative position between the work machine 2 and each of the plurality of detection points DP of the object. In the following description, an energy wave that scans an object in order to detect the object, such as a laser beam or a radio wave, is appropriately referred to as a detection wave.

The wireless communication device 28 wirelessly communicates with the wireless communication device 6 connected to the management device 3. The communication system 4 includes the wireless communication device 28.

The data processing device 10 includes a computer system and is disposed in the main vehicle body 21. The data processing device 10 processes detection data of the position sensor 31 and detection data of the non-contact sensor 32.

The travel control device 40 includes a computer system and is disposed in the main vehicle body 21 The travel control device 40 controls a traveling state of the traveling device 23 of the work machine 2. The travel control device 40 outputs an operation command including an accelerating command for operating the driving device 23A, a braking command for operating the braking device 23B, and a steering command for operating the steering device 23C. The driving device 23A generates a driving force for accelerating the work machine 2 on the basis of the accelerating command output from the travel control device 40. The braking device 23B generates a braking force for decelerating or stopping the work machine 2 on the basis of the brake command output from the travel control device 40. The steering device 23C generates a swing force for changing the direction of the front wheels 27F in order to cause the work machine 2 to go straight or swing on the basis of the steering command output from the travel control device 40.

[Traveling Path]

Figure 2:
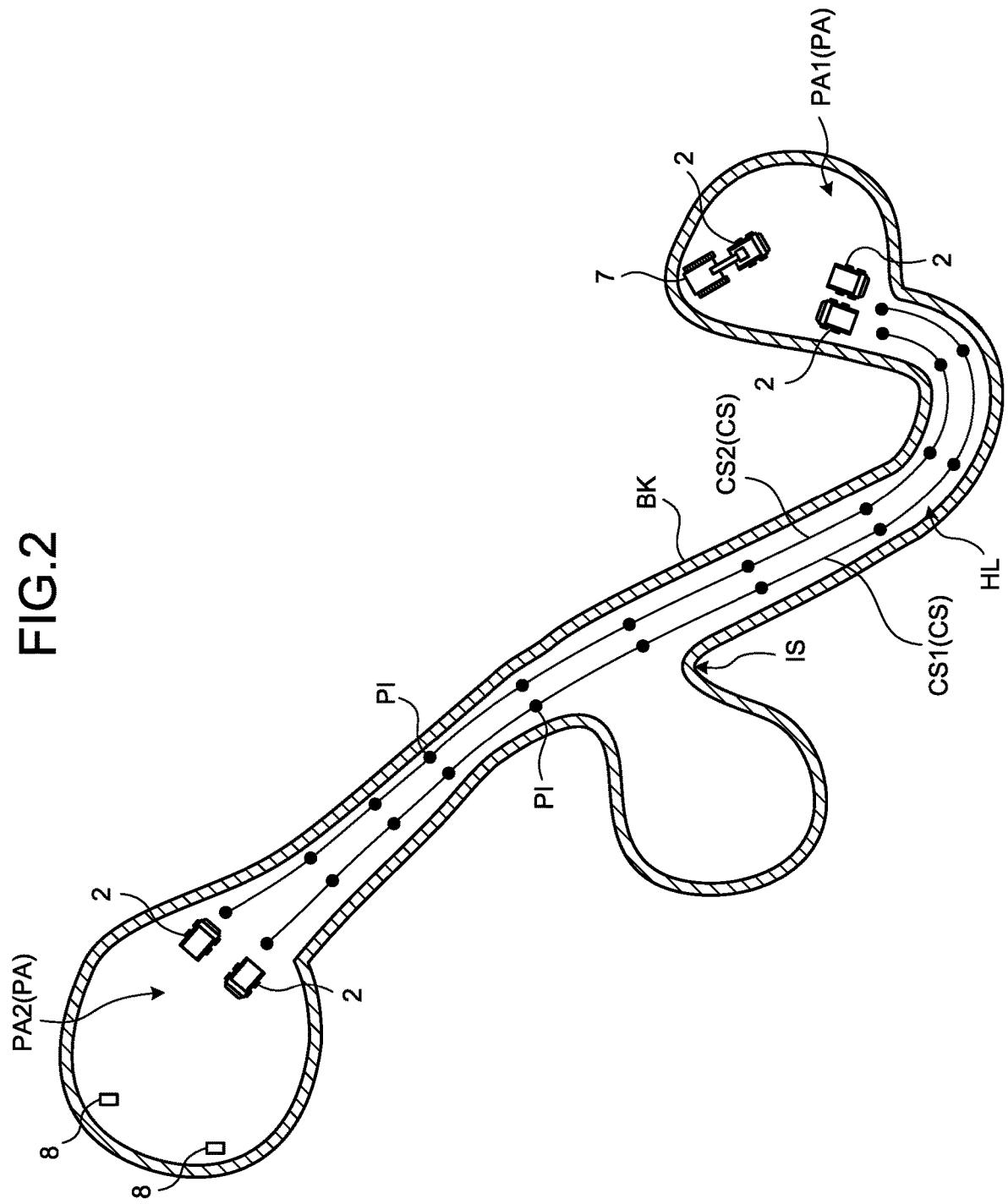
FIG. 2 is a diagram schematically illustrating the work machine and a traveling path according to the first embodiment.

FIG. 2 is a diagram schematically illustrating the work machine 2 and the traveling path HL according to the present embodiment. The traveling path HL leads to a plurality of work areas PA in a mine. The work area PA includes at least one of a loading area PA1 and an earth discharging area PA2. An intersection IS may be formed on the traveling path HL.

The loading area PA1 refers to an area where loading work for loading a load on the work machine 2 is performed. In the loading area PA1, a loader 7 such as a hydraulic excavator operates. The earth discharging area PA2 refers to an area where discharging work for discharging a load from the work machine 2 is performed. A crusher 8 is disposed in the earth discharging area PA2, for example.

The management device 3 sets a traveling condition of the work machine 2 on the traveling path HL. The work machine 2 travels on the traveling path HL on the basis of traveling condition data indicating the traveling condition transmitted from the management device 3.

The traveling condition data includes a target traveling speed of the work machine 2 and a target traveling course CS thereof. As illustrated in FIG. 2, the traveling condition data includes a plurality of points PI set on the traveling path HL at intervals. The points PI indicate target positions of the work machine 2 defined in the global coordinate system. Note that the points PI may be defined in the local coordinate system of the work machine 2.

The target traveling speed is set for each of the plurality of points PI. The target traveling course CS is defined by a line connecting the plurality of points PI to each other.

[Non-Contact Sensor]

Figure 3:
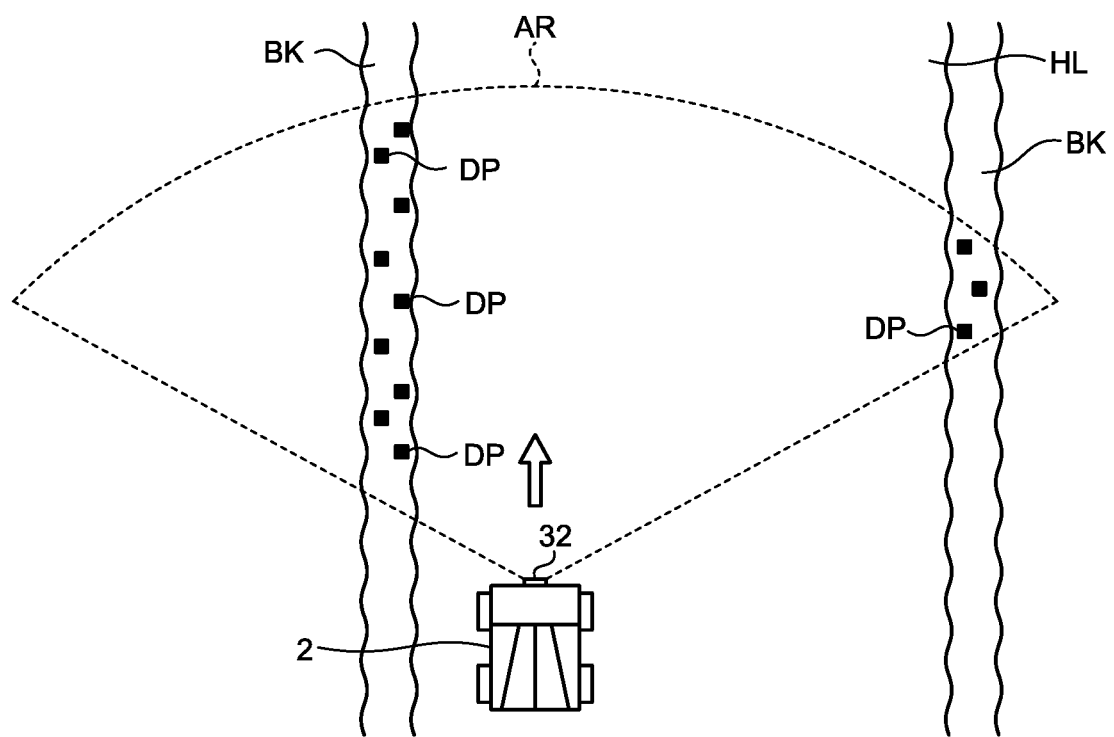
FIG. 3 is a diagram schematically exemplifying a non-contact sensor according to the first embodiment.

FIG. 3 is a diagram schematically exemplifying the non-contact sensor 32 according to the present embodiment. The non-contact sensor 32 is disposed in a front part of the main vehicle body 21 of the work machine 2. The number of the non-contact sensors 32 may be one or more. A detection range AR of the non-contact sensor 32 is radial. Scanning is performed with a detection wave in the radial detection range AR. The non-contact sensor 32 scans an object in the detection range AR with a detection wave, and acquires point group data indicating the three-dimensional shape of the object. The point group data is an assembly of a plurality of detection points DP on a surface of the object. The detection points DP include an irradiation point irradiated with a detection wave on the surface of the object. The non-contact sensor 32 scans at least some of objects around the work machine 2 with a detection wave to detect a relative position with respect to each of the plurality of detection points DP of the object.

The bank BK is formed beside the traveling path HL. The bank BK is an object projecting above a road surface on which the work machine 2 travels beside the traveling path HL. For example, the banks BK are formed on both sides of the traveling path HL. An object detected by the non-contact sensor 32 includes the bank BK which is an object beside the traveling path HL on which the work machine 2 travels.

The non-contact sensor 32 irradiates the bank BK with a detection wave, and acquires point group data indicating the three-dimensional shape of a surface of the bank BK. The point group data is an assembly of a plurality of detection points DP on the surface of the bank BK. The non-contact sensor 32 detects a relative position with respect to each of the plurality of detection points DP of the bank BK.

The non-contact sensor 32 scans an object while the work machine 2 is traveling. Due to the shape of the bank BK and the relative position between the bank BK and the work machine 2, even when the bank BK is formed in the detection range AR, a portion not irradiated with a detection wave may be generated. Even when the bank BK is irradiated with a detection wave, the detection wave reflected by the bank BK is not necessarily detected by the non-contact sensor 32. Therefore, the plurality of detection points DP is detected at intervals (sparsely) on the surface of the bank BK.

[Control System]

Figure 4:
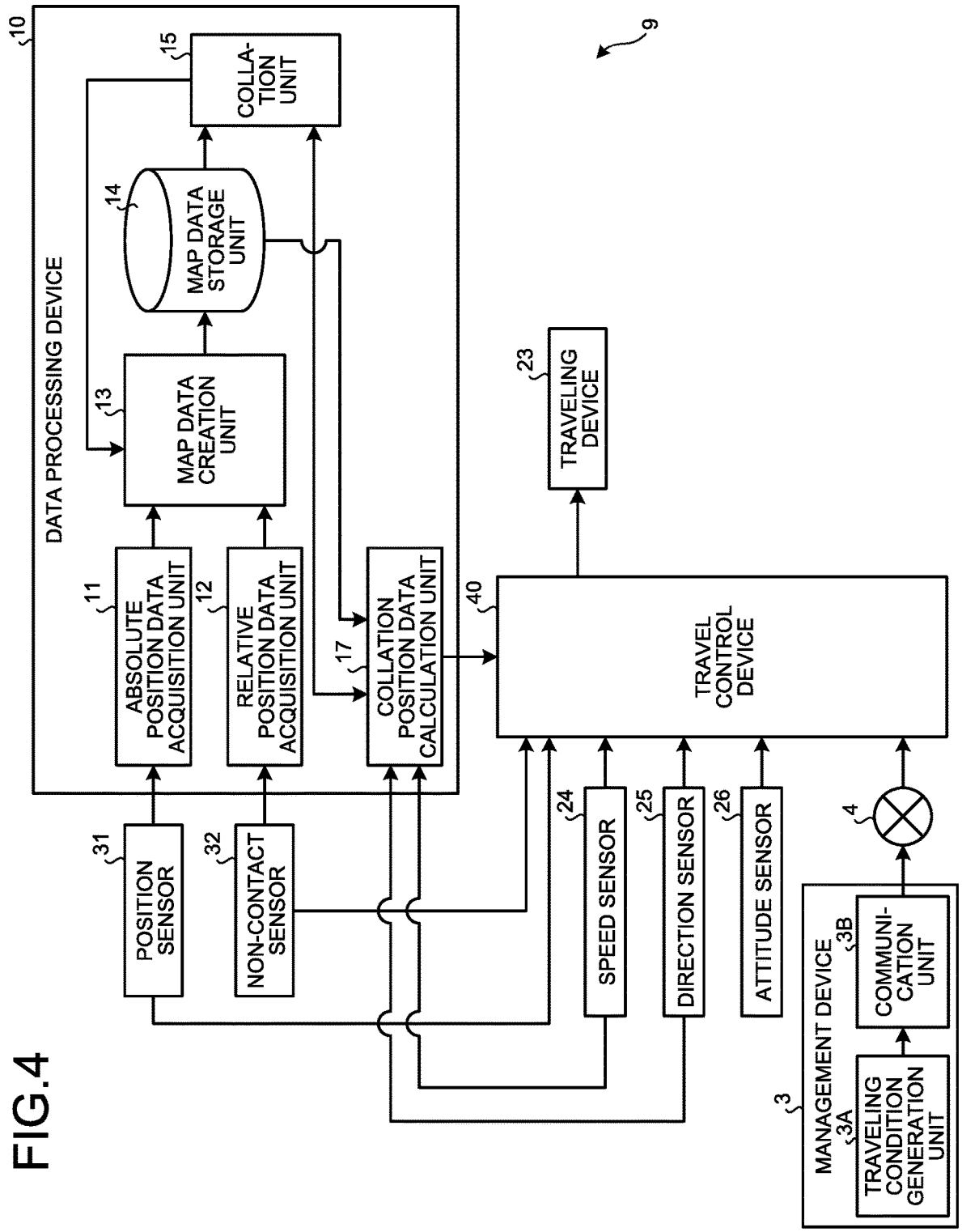
FIG. 4 is a functional block diagram illustrating a work machine control system according to the first embodiment.

FIG. 4 is a functional block diagram illustrating a control system 9 of the work machine 2 according to the present embodiment. The control system 9 includes the data processing device 10 and the travel control device 40. Each of the data processing device 10 and the travel control device 40 can communicate with the management device 3 via the communication system 4.

The management device 3 includes a traveling condition generation unit 3A and a communication unit 3B. The traveling condition generation unit 3A generates traveling condition data indicating a traveling condition of the work machine 2. The traveling condition is determined by, for example, an administrator who exists in a control facility. The administrator operates an input device connected to the management device 3. The traveling condition generation unit 3A generates traveling condition data on the basis of input data generated by operation of the input device. The communication unit 3B transmits the traveling condition data to the work machine 2. The travel control device 40 of the work machine 2 acquires the traveling condition data transmitted from the communication unit 3B via the communication system 4.

(Data Processing Device)

The data processing device 10 includes an absolute position data acquisition unit 11, a relative position data acquisition unit 12, a map data creation unit 13, a map data storage unit 14, a collation unit 15, and a collation position data calculation unit 17.

The absolute position data acquisition unit 11 acquires absolute position data indicating the absolute position of the work machine 2 from the position sensor 31. The position sensor 31 outputs a positioning signal indicating that the work machine 2 could be positioned and a non-positioning signal indicating that the work machine 2 could not be positioned. The absolute position data acquisition unit 11 acquires a positioning signal or a non-positioning signal from the position sensor 31.

The relative position data acquisition unit 12 acquires relative position data indicating a relative position between the work machine 2 and a detection point DP of an object from the non-contact sensor 32. The non-contact sensor 32 can detect a relative position with respect to each of a plurality of detection points DP by one scan. The relative position data acquisition unit 12 acquires relative position data between the work machine 2 and each of a plurality of detection points DP of an object from the non-contact sensor 32.

The map data creation unit 13 creates map data of a work site on the basis of detection data of the position sensor 31 and detection data of the non-contact sensor 32. That is, the map data creation unit 13 creates map data of a work site on the basis of absolute position data of the work machine 2 acquired by the absolute position data acquisition unit 11 and relative position data with respect to each of a plurality of detection points DP acquired by the relative position data acquisition unit 12. The map data of a work site indicates presence or absence and the position of a detection point DP of an object around the work machine 2. In the present embodiment, the map data of an object includes map data of the bank BK.

The map data creation unit 13 creates map data when a positioning signal is acquired and the detection accuracy of the absolute position of the work machine 2 detected by the position sensor 31 is equal to or higher than a defined accuracy (when the accuracy is high). The creation of map data includes a process of storing a detection point DP detected by the non-contact sensor 32 in the map data storage unit 14.

The creation of map data is performed while the work machine 2 travels in a normal traveling mode described later when the detection accuracy of the position sensor 31 is high. When the detection accuracy of the position sensor 31 decreases, the normal traveling mode is switched to a collation traveling mode described later, and the work machine 2 travels in the collation traveling mode.

In the present embodiment, the map data creation unit 13 creates map data on the basis of absolute position data of the work machine 2 detected by the position sensor 31, direction data of the work machine 2 detected by the direction sensor 25, and relative position data of a detection point DP detected by the non-contact sensor 32. The map data creation unit 13 integrates the absolute position data and the direction data of the work machine 2 with the relative position data of a detection point DP to create map data of the bank BK.

In the present embodiment, the map data creation unit 13 creates map data on the basis of a detection point DP of an object detected by the non-contact sensor 32 and satisfying a defined matching condition, and detection data of the position sensor 31. As described later, the matching condition includes that a matching ratio between existing detection points DPe forming map data stored in the map data storage unit 14 and current state detection points DPc detected by the non-contact sensor 32 is equal to or lower than a threshold of the matching ratio.

The map data creation unit 13 creates map data at a defined cycle (for example, every 0.1 [seconds]). Determination of the matching condition is performed at the defined cycle, and the map data creation unit 13 creates map data at the defined cycle on the basis of a determination result of the matching condition.

The map data storage unit 14 stores map data created by the map data creation unit 13. A detection point DP includes an existing detection point DPe forming map data stored in the map data storage unit 14 and a current state detection point DPc detected by the non-contact sensor 32. The existing detection point DPe refers to a detection point DP that defines map data stored in the map data storage unit 14. The current state detection point DPc refers to a current state detection point DP detected by the non-contact sensor 32 and acquired by the relative position data acquisition unit 12.

The collation unit 15 collates relative position data of a plurality of existing detection points DPe stored in the map data storage unit 14 with relative position data of a plurality of current state detection points DPc acquired by the relative position data acquisition unit 12, and calculates a matching ratio between the current state detection points DPc and the existing detection points DPe.

The matching condition includes that the matching ratio between the existing detection points DPe and the current state detection points DPc is equal to or lower than a threshold of the matching ratio. The map data creation unit 13 creates map data on the basis of at least some of current state detection points DPc that do not match existing detection points DPe when the matching ratio calculated by the collation unit 15 is equal to or lower than the threshold of the matching ratio. As described above, the map data creation unit 13 creates map data at a defined cycle and stores the created map data in the map data storage unit 14. The map data stored in the map data storage unit 14 is updated at a defined cycle.

The collation position data calculation unit 17 collates detection data of the non-contact sensor 32 with map data created by the map data creation unit 13, and calculates collation position data indicating the collation position of the work machine 2. That is, the collation position data calculation unit 17 collates relative position data of a current state detection point DPc acquired by the relative position data acquisition unit 12 with map data stored in the map data storage unit 14, and calculates collation position data of the work machine 2. The collation position indicates the absolute position of the work machine 2 calculated by the collation position data calculation unit 17.

The collation position data calculation unit 17 calculates the collation position and direction of the work machine 2 on the basis of traveling speed data detected by the speed sensor 24, direction data detected by the direction sensor 25, and relative position data of a detection point DP detected by the non-contact sensor 32.

(Travel Control Device)

The travel control device 40 controls the traveling device 23 such that the work machine 2 travels according to traveling condition data generated by the management device 3. In the present embodiment, the travel control device 40 causes the work machine 2 to travel on the basis of at least one of a normal traveling mode in which the work machine 2 is caused to travel on the basis of absolute position data detected by the position sensor 31 and a collation traveling mode in which the work machine 2 is caused to travel on the basis of collation position data calculated by the collation position data calculation unit 17.

The normal traveling mode is a traveling mode that is executed when a positioning signal is acquired from the position sensor 31 and the detection accuracy of the absolute position of the work machine 2 detected by the position sensor 31 is high. The travel control device 40 controls the traveling device 23 on the basis of absolute position data detected by the position sensor 31 and traveling condition data when the travel control device 40 acquires a positioning signal from the position sensor 31 and determines that the detection accuracy of the absolute position of the work machine 2 detected by the position sensor 31 is high. That is, in the normal traveling mode, the travel control device 40 collates absolute position data of the work machine 2 detected by the position sensor 31 with coordinate data of a point PI, and controls a traveling state of the traveling device 23 such that a difference between the absolute position data of the work machine 2 and the coordinate data of the point PI is equal to or lower than an allowable value.

The collation traveling mode is a traveling mode that is executed when a non-positioning signal is acquired from the position sensor 31 and the detection accuracy of the absolute position of the work machine 2 detected by the position sensor 31 is low. The travel control device 40 controls the traveling device 23 on the basis of collation position data calculated by the collation position data calculation unit 17 and traveling condition data when the travel control device 40 acquires a non-positioning signal from the position sensor 31 and determines that the detection accuracy of the absolute position of the work machine 2 detected by the position sensor 31 is low. That is, in the collation traveling mode, the travel control device 40 collates collation position data of the work machine 2 calculated by the collation position data calculation unit 17 with coordinate data of a point PI, and controls a traveling state of the traveling device 23 such that a difference between the collation position data of the work machine 2 and the coordinate data of the point PI is equal to or lower than an allowable value.

Note that examples of a situation in which the detection accuracy of the position sensor 31 decreases include ionospheric abnormality due to solar flares and communication abnormality with the global navigation satellite system. For example, at a work site such as an open pit or an underground mine, communication abnormality with the global navigation satellite system is highly likely to occur.

[Process of Map Data Creation Unit]

Figure 5:
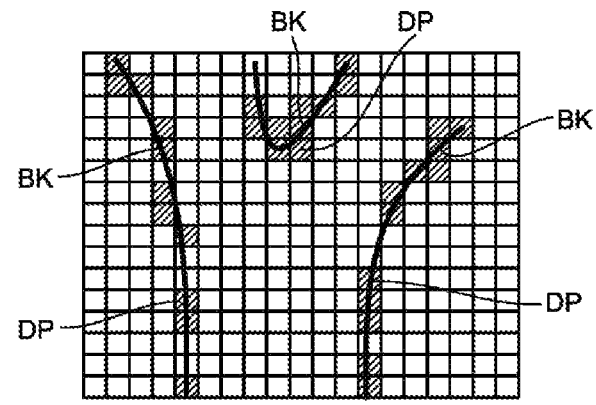
FIG. 5(A), FIG. 5(B) and FIG. 5(C) are schematic diagrams for explaining a process of a map data creation unit according to the first embodiment.
Figure 5:
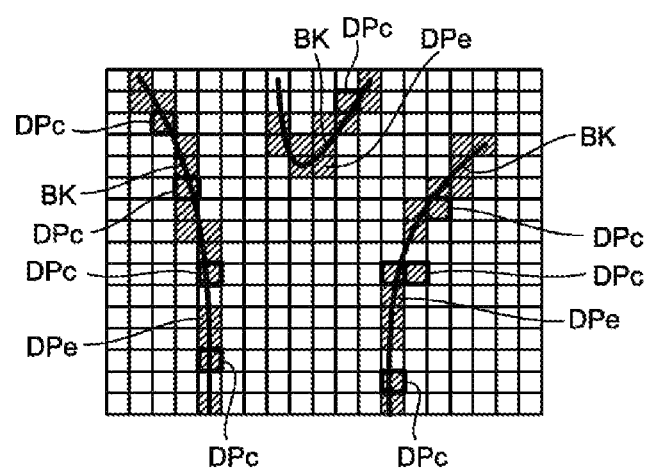
Figure 5:
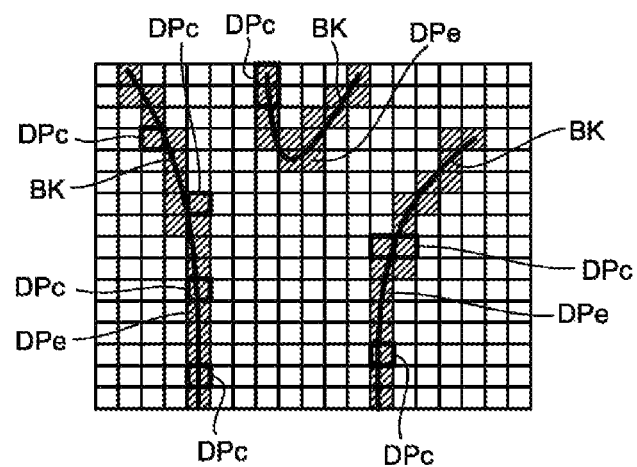

FIG. 5(A), FIG. 5(B) and FIG. 5(C) are schematic diagrams for explaining a process of the map data creation unit 13 according to the present embodiment. Map data includes grid data including a plurality of grids. A detection point DP is defined by one grid. A detection point DP is binary data indicating existence of the bank BK. When the bank BK is detected at a detection point DP, "1" is input to a grid as the detection point DP. When the bank BK is not detected, "0" is input to the grid.

At a work site such as a mine, the work machine 2 often travels on the same traveling path HL a plurality of times. The map data creation unit 13 creates map data on the basis of a detection point DP acquired in each travel after the work machine 2 travels in the same place a plurality of times.

FIG. 5(A) is a diagram schematically illustrating a detection point DP acquired when the work machine 2 travels in a specific place on the traveling path HL for the first time. The non-contact sensor 32 scans an object while the work machine 2 is traveling. As described above, detection points DP are sparsely detected on a surface of the bank BK. The map data creation unit 13 creates such map data as illustrated in FIG. 5(A) on the basis of the sparsely detected detection points DP. The map data created by the map data creation unit 13 is stored in the map data storage unit 14.

FIG. 5(B) is a diagram schematically illustrating a detection point DP acquired when the work machine 2 travels in the specific place on the traveling path HL for the second time. The map data creation unit 13 can determine whether or not the place in which the work machine 2 travels in the second travel is the specific place in which the work machine 2 traveled in the first travel on the basis of absolute position data of the work machine 2 acquired by the absolute position data acquisition unit 11. The map data creation unit 13 integrates a detection point DP detected in the second travel with map data created in the first travel. That is, the map data creation unit 13 creates map data so as to add a plurality of current state detection points DPc indicating current state detection points DP acquired by the relative position data acquisition unit 12 in the second travel to existing detection point DPe of map data stored in the map data storage unit 14. In FIG. 5(B), the map data stored in the map data storage unit 14 is defined by the existing detection points DPe. The map data creation unit 13 creates map data so as to add current state detection points DPc acquired in the second travel to existing detection points DPe acquired in the first travel.

FIG. 5(C) is a diagram schematically illustrating a detection point DP acquired when the work machine 2 travels in the specific place on the traveling path HL for the third time. The map data creation unit 13 integrates a detection point DP detected in the third travel with the map data created in the first and second travels. That is, the map data creation unit 13 creates map data so as to add a plurality of current state detection points DPc indicating current state detection points DP acquired by the relative position data acquisition unit 12 in the third travel to existing detection point DPe of map data stored in the map data storage unit 14.

In this way, when the work machine 2 travels in the same place a plurality of times, detection points DP acquired in the travels are accumulated. As the number of times of travels increases, map data more exactly matching the actual position and shape of the bank BK is constructed.

[Processing of Collation Unit]

Figure 6:
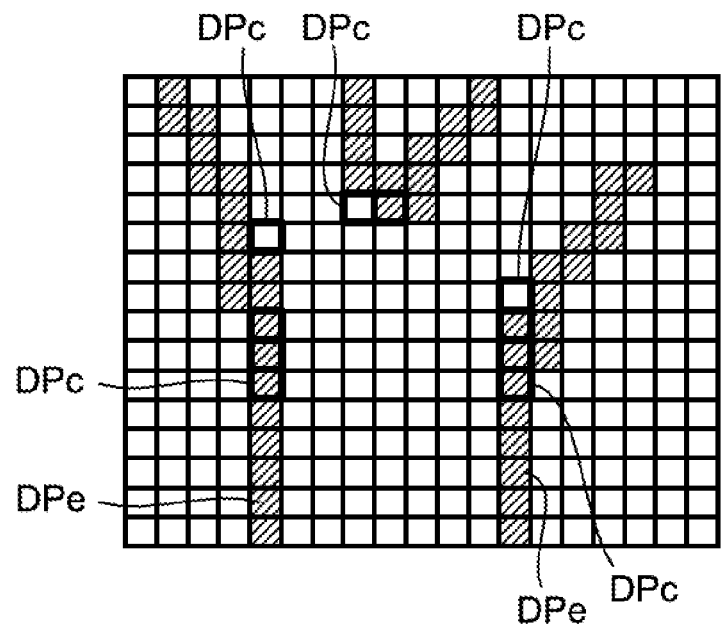
FIG. 6(A) and FIG. 6(B) are schematic diagrams for explaining a process of a collation unit according to the first embodiment.
Figure 6:
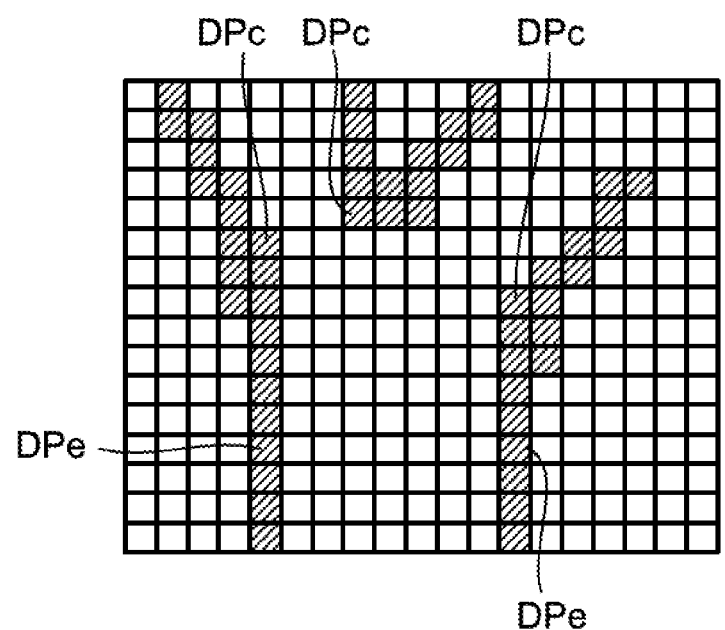
Figure 7:
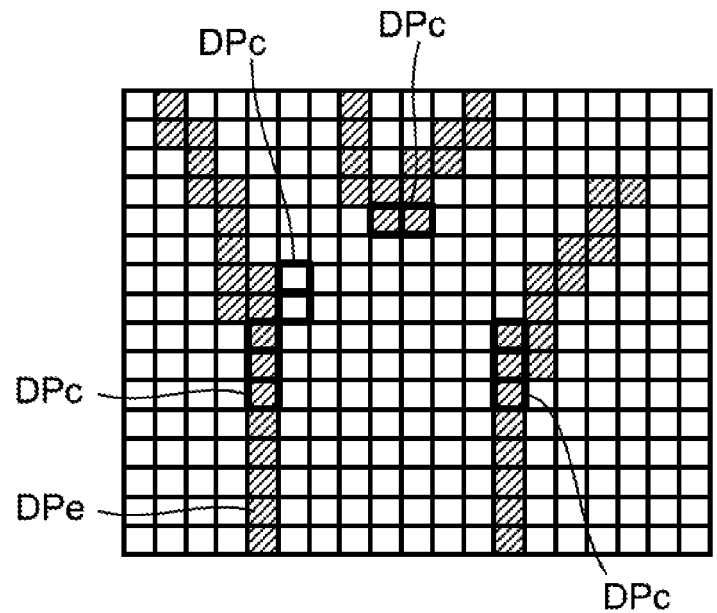
FIG. 7(A) and FIG. 7(B) are schematic diagrams for explaining the process of the collation unit according to the first embodiment.
Figure 7:
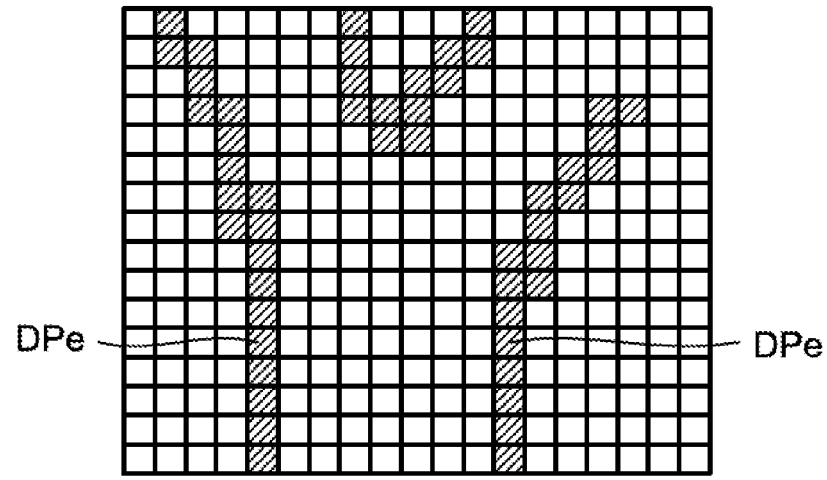

FIGS. 6 and 7 are schematic diagrams for explaining a process of the collation unit 15 according to the present embodiment.

The collation unit 15 collates relative position data of a plurality of current state detection points DPc acquired by the relative position data acquisition unit 12 with relative position data of a plurality of existing detection points DPe that defines map data stored in the map data storage unit 14, and calculates a matching ratio between the current state detection points DPc and the existing detection points DPe.

The collation unit 15 collates relative position data of a plurality of current state detection points DPc acquired by one scan of the non-contact sensor 32 with relative position data of a plurality of existing detection points DPe that defines map data.

FIG. 6(A) and FIG. 6(B) are diagrams schematically illustrating detection points DP acquired, for example, when the work machine 2 travels in the specific place on the traveling path HL for the fourth time.

In the example illustrated in FIG. 6(A) and FIG. 6(B), the number of current state detection points DPc detected by one scan of the non-contact sensor 32 is ten. As illustrated in FIG. 6(A), of the ten current state detection points DPc, seven current state detection points DPc match existing detection points DPe, and three current state detection points DPc do not match the existing detection points DPe. The collation unit 15 calculates that a matching ratio between the current state detection points DPc and the existing detection points DPe is 70 [%].

The map data creation unit 13 creates map data using current state detection points DPc that do not match existing detection points DPe when a matching ratio calculated by the collation unit 15 is equal to or lower than a threshold of the matching ratio.

As an example, it is assumed that the threshold of the matching ratio is 75 [%]. In the example illustrated in FIG. 6(A) and FIG. 6(B), the matching ratio is equal to or lower than the threshold of the matching ratio.

As illustrated in FIG. 6(A), when the matching ratio is equal to or lower than the threshold of the matching ratio, the map data creation unit 13 creates map data so as to add a current state detection point DPc that does not match an existing detection point DPe to the existing detection points DPe of map data stored in the map data storage unit 14. The created map data is stored in the map data storage unit 14.

That is, the creation of map data by the map data creation unit 13 includes a process of adding a current state detection point DPc that does not match an existing detection point DPe to map data. As illustrated in FIG. 6(B), the map data creation unit 13 adds a current state detection point DPc that does not match an existing detection point DPe to map data stored in the map data storage unit 14.

FIG. 7(A) and FIG. 7(B) illustrate an example in which the matching ratio is higher than the threshold of the matching ratio. In the example illustrated in FIG. 7(A) and FIG. 7(B), the number of current state detection points DPc acquired by one scan of the non-contact sensor 32 is ten. As illustrated in FIG. 7(A), of the ten current state detection points DPc, eight current state detection points DPc match existing detection points DPe, and two current state detection points DPc do not match the existing detection points DPe. The collation unit 15 calculates that a matching ratio between the current state detection points DPc and the existing detection points DPe is 80 [%].

When the threshold of the matching ratio is 75 [%], the matching ratio is higher than the threshold of the matching ratio in the example illustrated in FIG. 7(A) and FIG. 7(B).

As illustrated in FIG. 7(A), when the matching ratio is higher than the threshold of the matching ratio, the map data creation unit 13 does not create map data using a current state detection point DPc. In the present embodiment, the map data creation unit 13 deletes a current state detection point DPc that does not match an existing detection point DPe. That is, when the matching ratio is higher than the threshold of the matching ratio, the map data creation unit 13 deletes a current state detection point DPc without adding the current state detection point DPc to map data stored in the map data storage unit 14.

When the matching ratio is high, a current state detection point DPc that does not match an existing detection point DPe is highly likely to be noise. At a work site such as a mine, a condition of a road surface on the traveling path HL is highly likely to change daily. For example, a rut may be generated on the traveling path HL due to travel of the work machine 2, the shape of the road surface may change due to repair work, or the road surface may be in a state in which slip easily occurs due to rainwater. Therefore, in a case where the work machine 2 travels on the same traveling path HL a plurality of times, when the state of the road surface becomes different at a specific number of times of travels, even if the same specific position is detected in the same specific place, the position of a current state detection point DPc detected by the non-contact sensor 32 does not necessarily match the position of an existing detection point DPe. A current state detection point DPc that does not match an existing detection point DPe is highly likely to be noise.

In a case where the matching ratio is high, if a current state detection point DPc which is regarded as noise that does not match an existing detection point DPe is continuously added to map data, a plurality of grids representing a surface of an object (wall surface of the bank BK) in the map data may be arranged in a direction orthogonal to the surface of the object, for example. For example, in the map data, the surface of the object may be indicated by a thick line.

That is, if a current state detection point DPc which is regarded as noise is continuously added to the map data, when the non-contact sensor 32 detects a detection point DP of an object while the work machine 2 circulates on the same traveling path HL, the current state detection point DPc which should be originally unnecessary is added to the map data. Therefore, a grid may be added to a position different from the actual surface of the object, a phenomenon that a line indicating the surface of the object is thick may occur, and the shape and position of the object indicated in the map data may deviate from the actual shape and position of the object. As a result, when detection data of the non-contact sensor 32 is collated with the map data, the accuracy of position measurement of the work machine 2 calculated may decrease.

Figure 8:
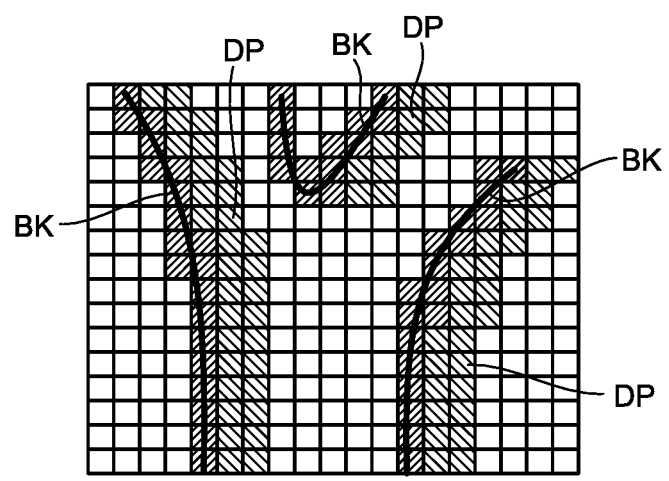
FIG. 8 is a diagram exemplifying map data according to a comparative example.

FIG. 8 is a diagram exemplifying map data according to a comparative example. As illustrated in FIG. 8, if a current state detection point DPc that does not match an existing detection point DPe is continuously added to the map data, a plurality of grids representing a surface of the bank BK may be arranged in a direction orthogonal to the surface of the bank BK. As a result, a line indicating the surface (wall surface) of the bank BK may be thick, and the shape and position of the bank BK indicated in the map data may deviate from the actual shape and position of the bank BK.

In the present embodiment, the map data creation unit 13 does not create map data using a current state detection point DPc detected by the non-contact sensor 32 when the matching ratio is equal to or lower than the threshold of the matching ratio. As a result, reflection of a current state detection point DPc regarded as noise on map data is suppressed, and creation of map data that deviates from the actual shape and position of the bank BK is suppressed.

[Map Data Creating Method]

Figure 9:
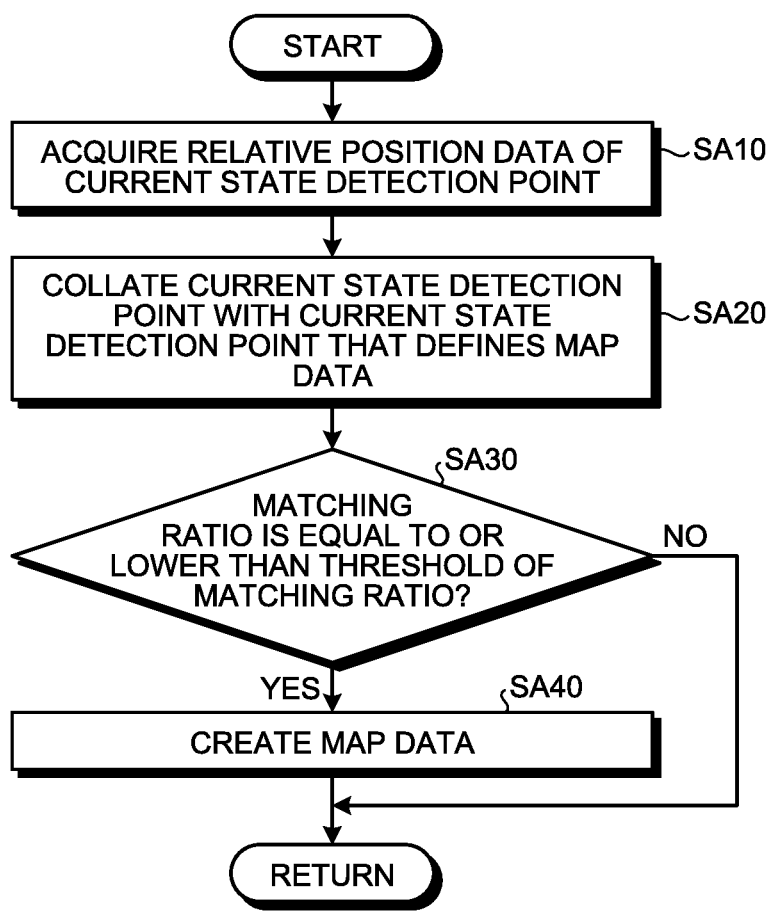
FIG. 9 is a flowchart illustrating a map data creating method according to the first embodiment.

Next, a map data creating method according to the present embodiment will be described. FIG. 9 is a flowchart illustrating the map data creating method according to the present embodiment.

As a premise that the map data creating method illustrated in FIG. 9 is performed, it is assumed that the work machine 2 has already traveled in a specific place on the traveling path HL in a normal traveling mode in a state where the detection accuracy of the position sensor 31 is high, and that map data is stored in the map data storage unit 14. The data processing device 10 repeatedly executes the process illustrated in FIG. 9 at a defined cycle in travel of the work machine 2.

The position sensor 31 detects the absolute position of the work machine 2 while the work machine 2 travels in the specific place. The non-contact sensor 32 scans at least a part of an object with a detection wave. Detection data of the position sensor 31 and detection data of the non-contact sensor 32 are output to the data processing device 10.

The relative position data acquisition unit 12 acquires relative position data of a current state detection point DPc from the non-contact sensor 32 (step SA10).

The collation unit 15 collates relative position data of a plurality of current state detection points DPc acquired by the relative position data acquisition unit 12 with relative position data of a plurality of existing detection points DPe that defines map data stored in the map data storage unit 14, and calculates a matching ratio between the current state detection points DPc and the existing detection points DPe (step SA20).

The collation unit 15 determines whether or not the calculated matching ratio is equal to or lower than the threshold of the matching ratio (step SA30).

In step SA30, if it is determined that the matching ratio is equal to or lower than the threshold of the matching ratio (step SA30: Yes), the map data creation unit 13 creates map data using a current state detection point DPc that does not match an existing detection point DPe as described with reference to FIG. 6(A) and FIG. 6(B) (step SA40). That is, the map data creation unit 13 performs a process of adding a current state detection point DPc that does not match an existing detection point DPe to map data.

In step SA30, if it is determined that the matching ratio is not equal to or lower than the threshold of the matching ratio (step SA30: No), the map data creation unit 13 does not create map data using a current state detection point DPc as described with reference to FIG. 7(A) and FIG. 7(B). The map data creation unit 13 deletes a current state detection point DPc that does not match an existing detection point DPe. In the map data storage unit 14, map data is not updated, and map data of one cycle before is held.

[Computer System]

Figure 10:
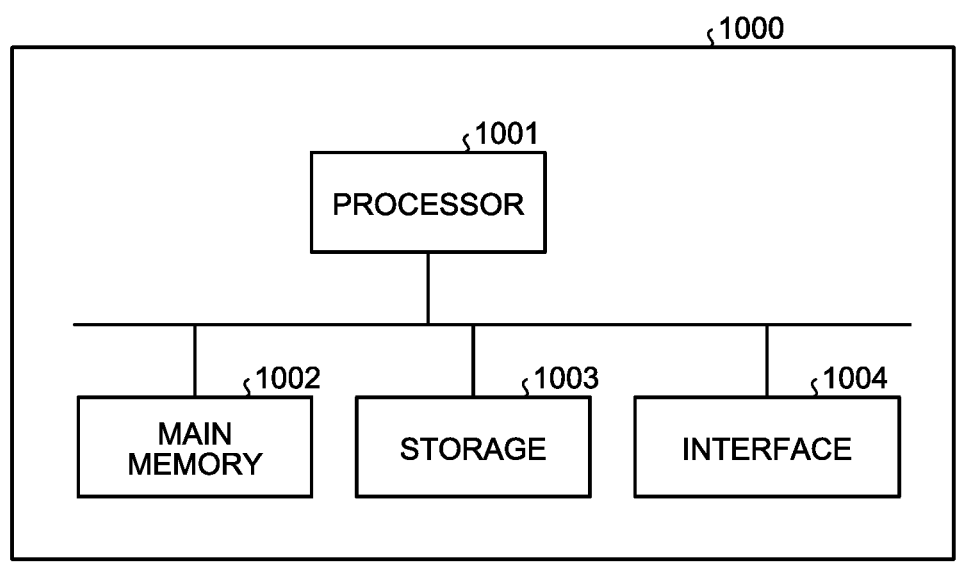
FIG. 10 is a block diagram exemplifying a computer system.

FIG. 10 is a block diagram exemplifying a computer system 1000. Each of the management device 3, the data processing device 10, and the travel control device 40 described above includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The functions of the management device 3, the data processing device 10, and the travel control device 40 described above are stored in the storage 1003 as a program. The processor 1001 reads the program from the storage 1003, develops the program in the main memory 1002, and executes the above-described processing according to the program. Note that the program may be distributed to the computer system 1000 via a network.

[Effect]

As described above, according to the present embodiment, a matching ratio between current state detection points DPc and existing detection points DPe is calculated, and map data is created on the basis of at least some of the current state detection points DPc when the matching ratio is equal to or lower than the threshold of the matching ratio. When the matching ratio is low (equal to or lower than the threshold of the matching ratio), it can be regarded that map data has not been sufficiently constructed. Therefore, by adding a current state detection point DPc to existing map data and accumulating detection points DP, it is possible to construct map data matching the actual position and shape of the bank BK.

Meanwhile, when the matching ratio is high (when the matching ratio is not equal to or lower than the threshold of the matching ratio), it can be regarded that map data has already been sufficiently constructed. A current state detection point DPc that does not match an existing detection point DPe of the already sufficiently constructed map data can be regarded as noise. In the present embodiment, map data is not created using a current state detection point DPc that is regarded as noise. As a result, inclusion of noise in map data is suppressed when the map data is created. An influence of noise is suppressed when map data is created, and highly accurate map data can be created. Therefore, a decrease in the accuracy of position measurement of the work machine 2 calculated is suppressed when detection data of the non-contact sensor 32 is collated with the map data. Therefore, for example, in a case where the detection accuracy of the position sensor 31 decreases, when the work machine 2 is caused to travel while detection data of the non-contact sensor 32 is collated with the map data, the work machine 2 can travel accurately according to traveling condition data.

Second Embodiment

A second embodiment will be described. In the following description, to components that are the same as or equivalent to those in the above-described embodiment, the same reference numerals are assigned, and description thereof will be simplified or omitted.

In the present embodiment, a case where a plurality of current state detection points DPc is detected by a plurality of scans of a non-contact sensor 32, and the matching condition is that the number of detection times at which the same current state detection point DPc has been detected is equal to or higher than a threshold of the number of detection times will be described.

Figure 11:
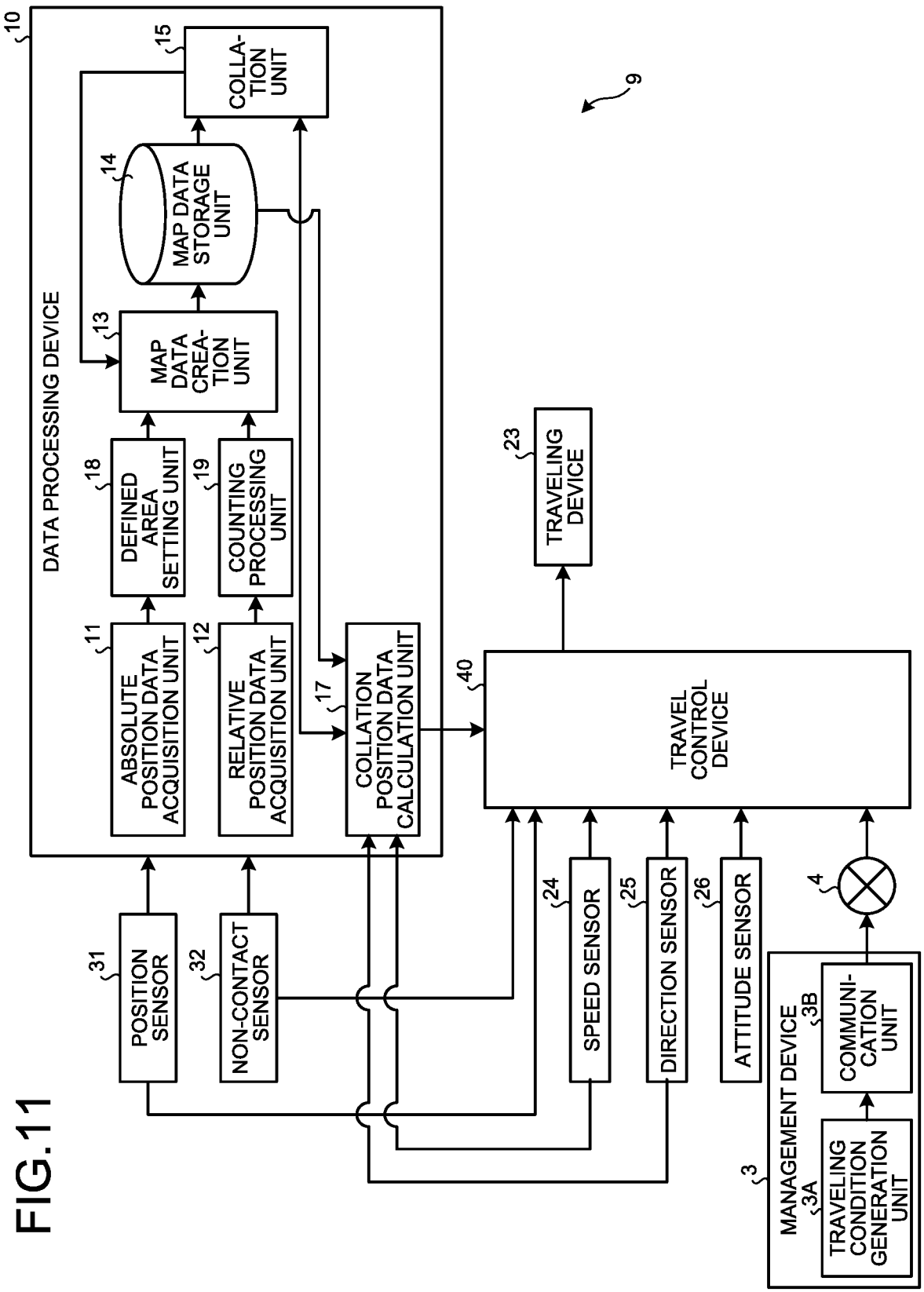
FIG. 11 is a functional block diagram illustrating a work machine control system according to a second embodiment.

FIG. 11 is a functional block diagram illustrating a work machine control system 9 according to the present embodiment. In the present embodiment, a data processing device 10 includes a defined area setting unit 18 that sets a defined area around a work machine 2, and a counting processing unit 19 that counts the number of detection times at which the same current state detection point DPc has been detected by a plurality of scans in a defined area CA.

In the present embodiment, a map data creation unit 13 creates map data using a current state detection point DPc at which the number of detection times is equal to or higher than the threshold of the number of detection times. The map data creation unit 13 deletes a current state detection point DPc at which the number of detection times is lower than the threshold of the number of detection times.

Figure 12:
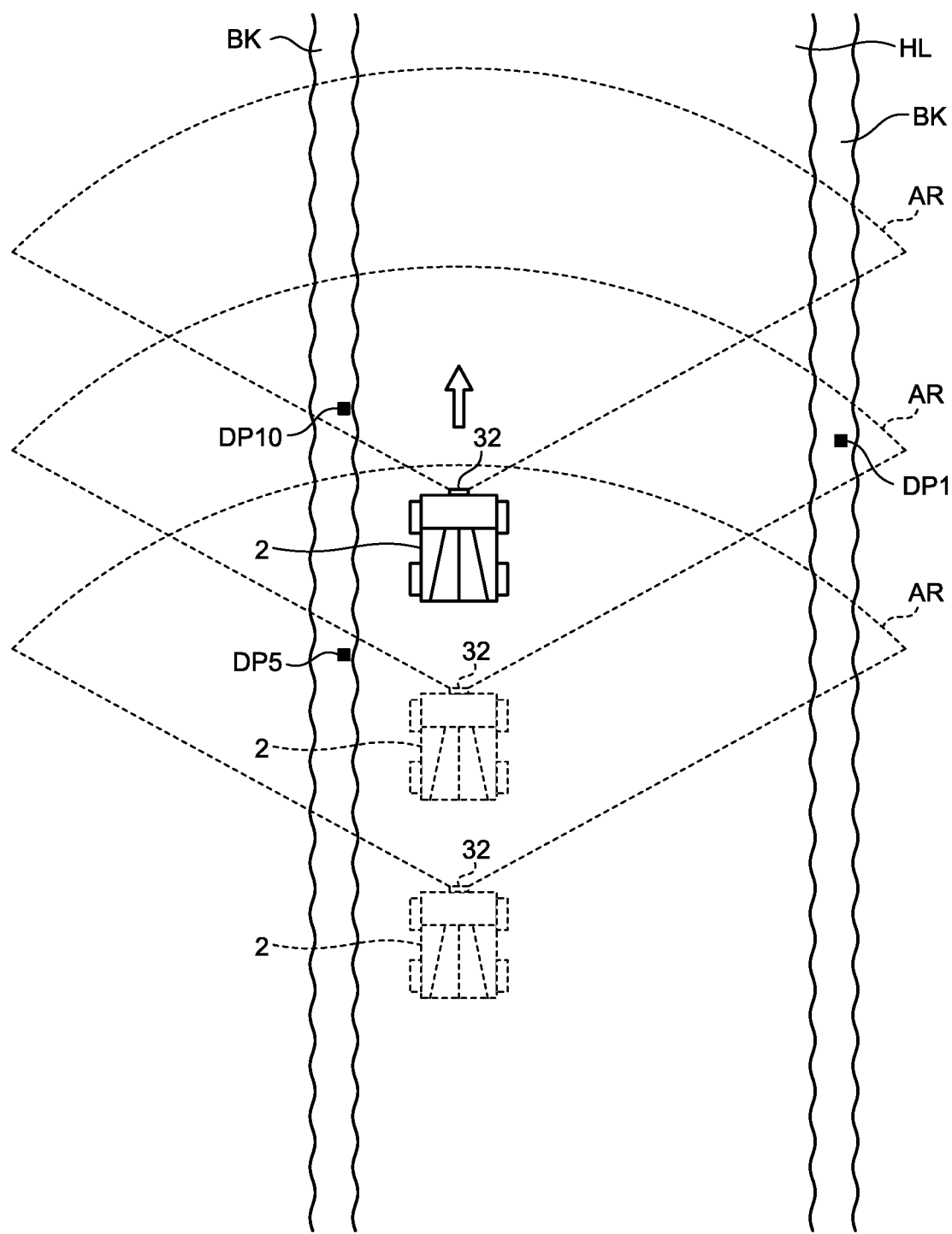
FIG. 12 is a diagram schematically exemplifying a non-contact sensor according to the second embodiment.

FIG. 12 is a diagram schematically exemplifying the non-contact sensor 32 according to the present embodiment. Similar to the above-described embodiment, the non-contact sensor 32 scans an object with a detection wave while the work machine 2 is traveling. The travel of the work machine 2 also moves a detection range AR. When the work machine 2 passes a specific place, as illustrated in FIG. 12, the same position of a bank BK is scanned with a detection wave a plurality of times.

For example, a detection point DP10 is a specific position of the bank BK detected by the non-contact sensor 32 ten times. A detection point DP5 is a specific position of the bank BK detected five times by the non-contact sensor 32. A detection point DP1 is a specific position of the bank BK detected once by the non-contact sensor 32.

A detection point DP at which the number of detection times is large can be regarded as a detection point DP at which the bank BK has been actually detected. Meanwhile, a detection point DP at which the number of detection times is small is highly likely to be noise.

Therefore, the map data creation unit 13 creates map data using a current state detection point DPc at which the number of detection times is equal to or higher than the threshold of the number of detection times.

The counting processing unit 19 counts the number of detection times at which the same current state detection point DPc has been detected. The counting processing unit 19 can determine whether or not a current state detection point DPc exists in the defined area CA on the basis of the size and shape of the defined area CA. The counting processing unit 19 counts the number of detection times in a period in which a current state detection point DPc exists in the defined area CA.

Similarly, the map data creation unit 13 can determine whether or not a current state detection point DPc exists in the defined area CA on the basis of the size and shape of the defined area CA.

Figure 13:
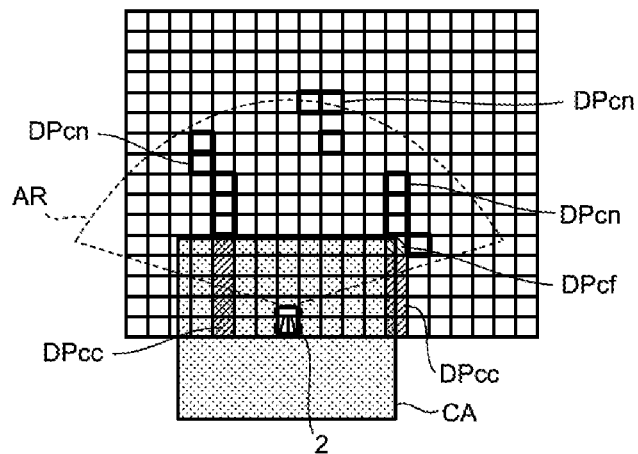
FIG. 13(A), FIG. 13(B) and FIG. 13(C) are schematic diagrams for explaining a process of a map data creation unit according to the second embodiment.
Figure 13:
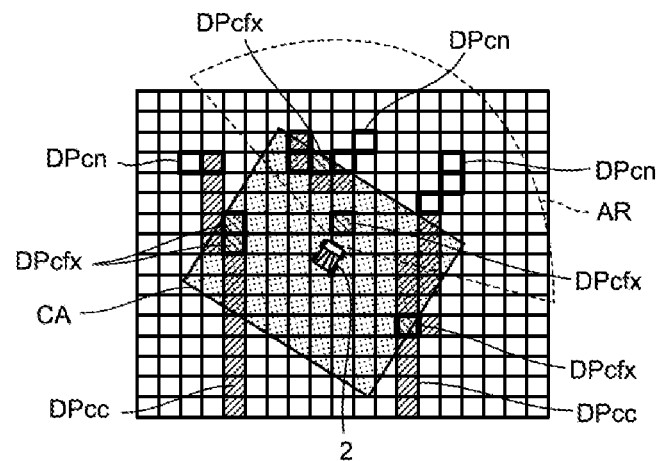
Figure 13:
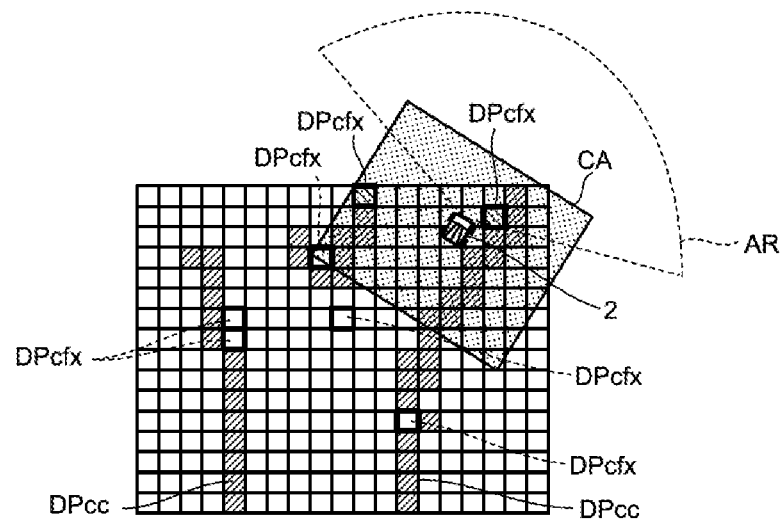

FIG. 13(A), FIG. 13(B) and FIG. 13(C) are schematic diagrams for explaining a process of the map data creation unit 13 according to the present embodiment. The defined area setting unit 18 sets the defined area CA around the work machine 2. The defined area setting unit 18 moves the defined area CA in synchronization with the work machine 2. Note that the defined area CA illustrated in FIG. 13(A), FIG. 13(B) and FIG. 13(C) is quadrangular, but the shape of the defined area CA is not limited to the quadrangle. The defined area CA may be circular, for example.

The counting processing unit 19 counts the number of detection times at which the same current state detection point DPc (the same specific position of the bank BK) has been detected by a plurality of scans and travel of the work machine 2 in the defined area CA.

In FIG. 13(A), a current state detection point DPcc indicates a current state detection point DPc at which the number of detection times is equal to or higher than the threshold of the number of detection times. A current state detection point DPcn indicates a current state detection point DPc detected at least once (a current state detection point DPc at which the number of detection times is at least one). A current state detection point DPcf indicates a current state detection point DPc at which the number of detection times is lower than the detection threshold.

FIG. 13(B) illustrates a state in which the work machine 2 has advanced from the state illustrated in FIG. 13(A). In FIG. 13(B), a current state detection point DPcfx indicates a current state detection point DPc at which it has been definitely determined that the number of detection times is lower than the threshold of the number of detection times in the defined area CA and which has been determined to be deleted.

FIG. 13(C) illustrates a state in which the work machine 2 has advanced from the state illustrated in FIG. 13(B). As illustrated in FIG. 13(C), when a current state detection point DPcfx leaves the defined area CA due to travel of the work machine 2, the map data creation unit 13 deletes the current state detection point DPcfx.

Figure 14:
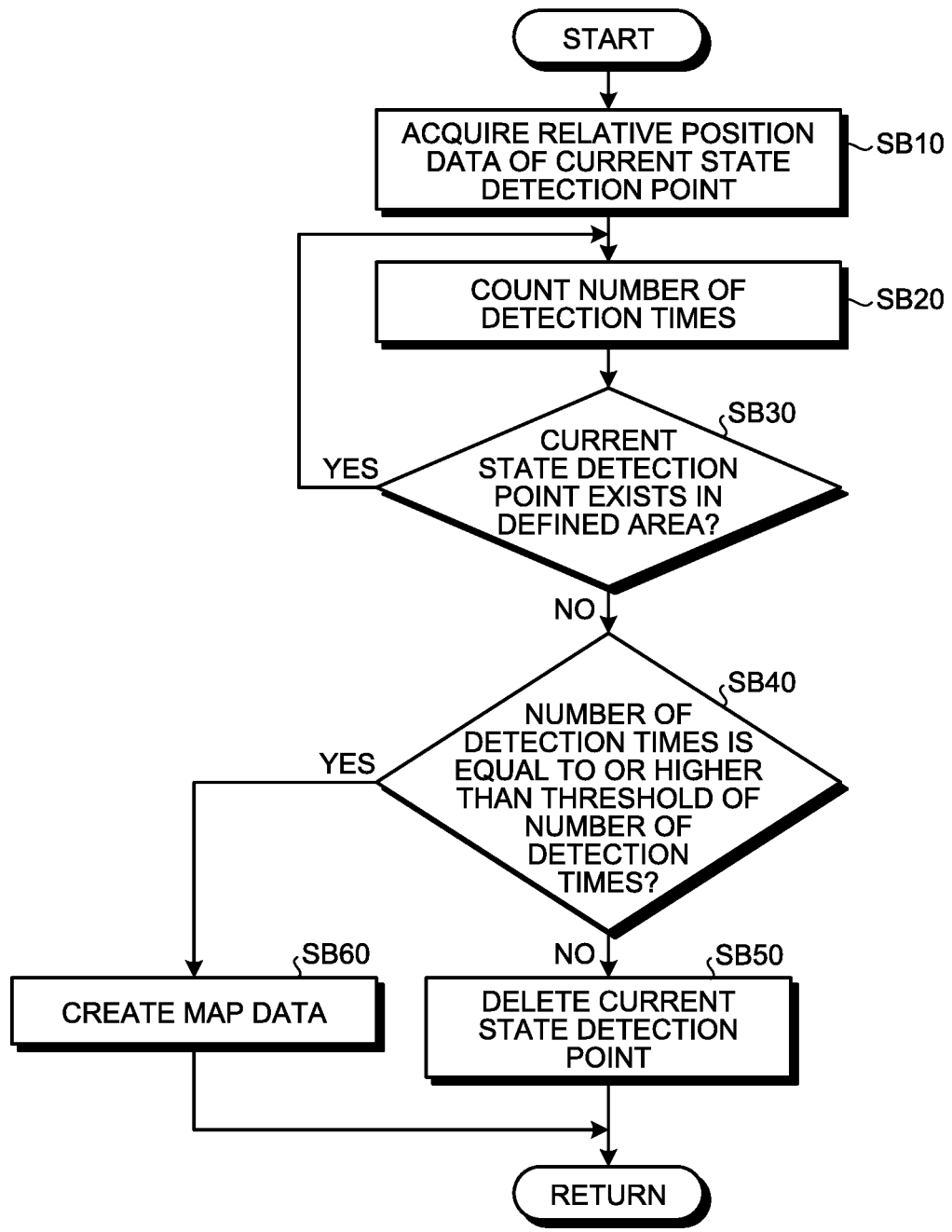
FIG. 14 is a flowchart illustrating a map data creating method according to the second embodiment.

Next, a map data creating method according to the present embodiment will be described. FIG. 14 is a flowchart illustrating the map data creating method according to the present embodiment.

In the following description, one current state detection point DPc will be described in order to simplify the description. Note that the data processing device 10 repeatedly executes the process illustrated in FIG. 14 at a defined cycle for each of a plurality of current state detection points DPc in travel of the work machine 2.

The work machine 2 travels on a traveling path HL. In travel of the work machine 2, the position sensor 31 detects the absolute position of the work machine 2. The non-contact sensor 32 scans at least a part of an object with a detection wave. Detection data of the position sensor 31 and detection data of the non-contact sensor 32 are output to the data processing device 10.

The defined area setting unit 18 moves the defined area CA in synchronization with the work machine 2. The defined area setting unit 18 moves the defined area CA while keeping the shape and size of the defined area CA constant.

The relative position data acquisition unit 12 acquires relative position data of a current state detection point DPc (step SB10).

The same current state detection point DPc may be detected a plurality of times by a plurality of scans of the non-contact sensor 32. The counting processing unit 19 counts the number of detection times at which a current state detection point DPc has been detected when the current state detection point DPc exists in the defined area CA (step SB20).

In travel of the work machine 2, a relative position between a current state detection point DPc and the work machine 2 or the defined area CA changes. For example, a current state detection point DPc existing in the defined area CA moves out of the defined area CA as the work machine 2 moves. On the basis of relative position data of a current state detection point DPc at which the number of detection times is counted and the size and shape of the defined area CA, the counting processing unit 19 determines whether or not the current state detection point DPc exists in the defined area CA (step SB30).

In step SB30, if it is determined that a current state detection point DPc exists in the defined area CA (step SB30: Yes), the counting processing unit 19 continues a process of counting the number of detection times of the current state detection point DPc existing in the defined area CA.

In step SB30, if it is determined that a current state detection point DPc does not exist in the defined area CA and is out of the defined area CA (step SB30: No), the counting processing unit 19 determines whether or not the number of detection times counted when the current state detection point DPc exists in the defined area CA is equal to or higher than the threshold of the number of detection times (step SB40).

In step SB40, if it is determined that the number of detection times is not equal to or higher than the threshold of the number of detection times (step SB40: No), the map data creation unit 13 deletes a current state detection point DPc at which the number of detection times has been determined to be lower than the threshold of the number of detection times from map data (step SB50).

In step SB40, if it is determined that the number of detection times is equal to or higher than the threshold of the number of detection times (step SB40: Yes), the map data creation unit 13 creates map data using a current state detection point DPc at which the number of detection times is equal to or higher than the threshold of the number of detection times (step SB60).

As described above, according to the present embodiment, the matching condition includes that the number of detection times of the current state detection point DPc detected in the defined area CA is equal to or higher than the threshold of the number of detection times. A current state detection point DPc at which the number of detection times is small can be regarded as noise. A current state detection point DPc regarded as noise is deleted without contributing to creation of map data. As a result, inclusion of noise in map data is suppressed when the map data is created.

Since a current state detection point DPc regarded as noise is deleted, data capacity stored in the map data storage unit 14 can be reduced.

When map data is created by accumulating detection points DP detected while the work machine 2 circulates on the same traveling path HL, a detection point DP detected in an initial travel is highly likely to be reflected on the map data. Even when the detection point DP detected in the initial travel is highly likely to be noise, the detection point DP is highly likely to be reflected on the map data. According to the present embodiment, it is determined whether or not a detection point DP is noise on the basis of the number of detection times. Therefore, noise can be more effectively deleted.

Third Embodiment

A third embodiment will be described. In the following description, to components that are the same as or equivalent to those in the above-described embodiments, the same reference numerals are assigned, and description thereof will be simplified or omitted.

Similar to the above-described second embodiment, also in the present embodiment, a plurality of current state detection points DPc is detected by a plurality of scans of a non-contact sensor 32. The matching condition includes that the number of detection times at which the same current state detection point DPc has been detected is equal to or higher than a threshold of the number of detection times.

In the present embodiment, a traveling path HL includes a road surface condition change position CP. A current state detection point DPc detected by the non-contact sensor 32 includes a current state detection point DPc of an object in front of a work machine 2 traveling on the traveling path HL.

Figure 15:
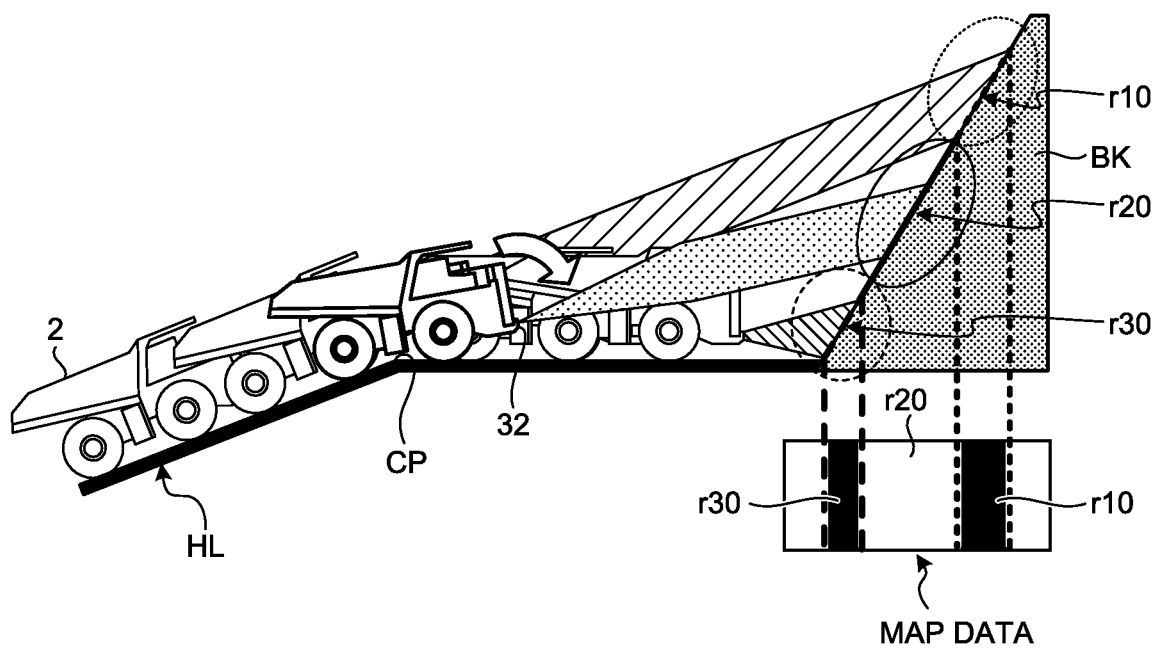
FIG. 15 is a diagram exemplifying detection by a non-contact sensor according to a third embodiment.

FIG. 15 is a diagram exemplifying detection by the non-contact sensor 32 according to the present embodiment. As illustrated in FIG. 15, the traveling path HL includes a road surface condition change position CP. The road surface condition change position CP refers to a position that causes a sudden change in the attitude of the work machine 2 traveling on the traveling path HL. Examples of the road surface condition change position CP include a boundary between an uphill road and a flat road in the traveling path HL, an obstacle such as a falling rock existing on the traveling path HL, and an uneven portion such as a rut formed on a road surface of the traveling path HL. When the work machine 2 passes the road surface condition change position CP, the attitude of the work machine 2 may suddenly change.

In the example illustrated in FIG. 15, it is assumed that the road surface condition change position CP is a boundary between an uphill road and a flat road. An object such as a bank BK exists in front of the work machine 2 traveling on the traveling path HL.

While the work machine 2 is traveling on an uphill road, the non-contact sensor 32 performs scanning with a detection wave to detect a current state detection point DPc in an upper area r10 of the bank BK. When the work machine 2 passes the road surface condition change position CP, the non-contact sensor 32 performs scanning with a detection wave to detect a current state detection point DPc in an intermediate region r20 of the bank BK. While the work machine 2 is traveling on a flat road, the non-contact sensor 32 performs scanning with a detection wave to detect a current state detection point DPc in a lower area r30 of the bank BK.

The counting processing unit 19 counts the number of detection times of a current state detection point DPc detected by a plurality of scans of the non-contact sensor 32.

The map data creation unit 13 creates map data using a current state detection point DPc at which the number of detection times is equal to or higher than the threshold of the number of detection times.

When the work machine 2 passes the road surface condition change position CP, the attitude of the work machine 2 changes suddenly. Therefore, the number of detection times of the same current state detection point DPc in the intermediate region r20 is highly likely to be lower than the threshold of the number of detection times. As described in the above-described embodiments, a current state detection point CPc at which the number of detection times is small can be regarded as noise. Therefore, the map data creation unit 13 creates map data using a current state detection point DPc at which the number of detection times is equal to or higher than the threshold of the number of detection times.

In the example illustrated in FIG. 15, the number of detection times of a current state detection point DPc in each of the upper region r10 and the lower region r30 is equal to or higher than the threshold of the number of detection times, and the number of detection times of a current state detection point DPc in the intermediate region r20 is lower than the threshold of the number of detection times. The map data creation unit 13 creates map data using current state detection points DPc in the upper region r10 and the lower region r30 without using a current state detection points DPc in the intermediate region r20.

Figure 16:
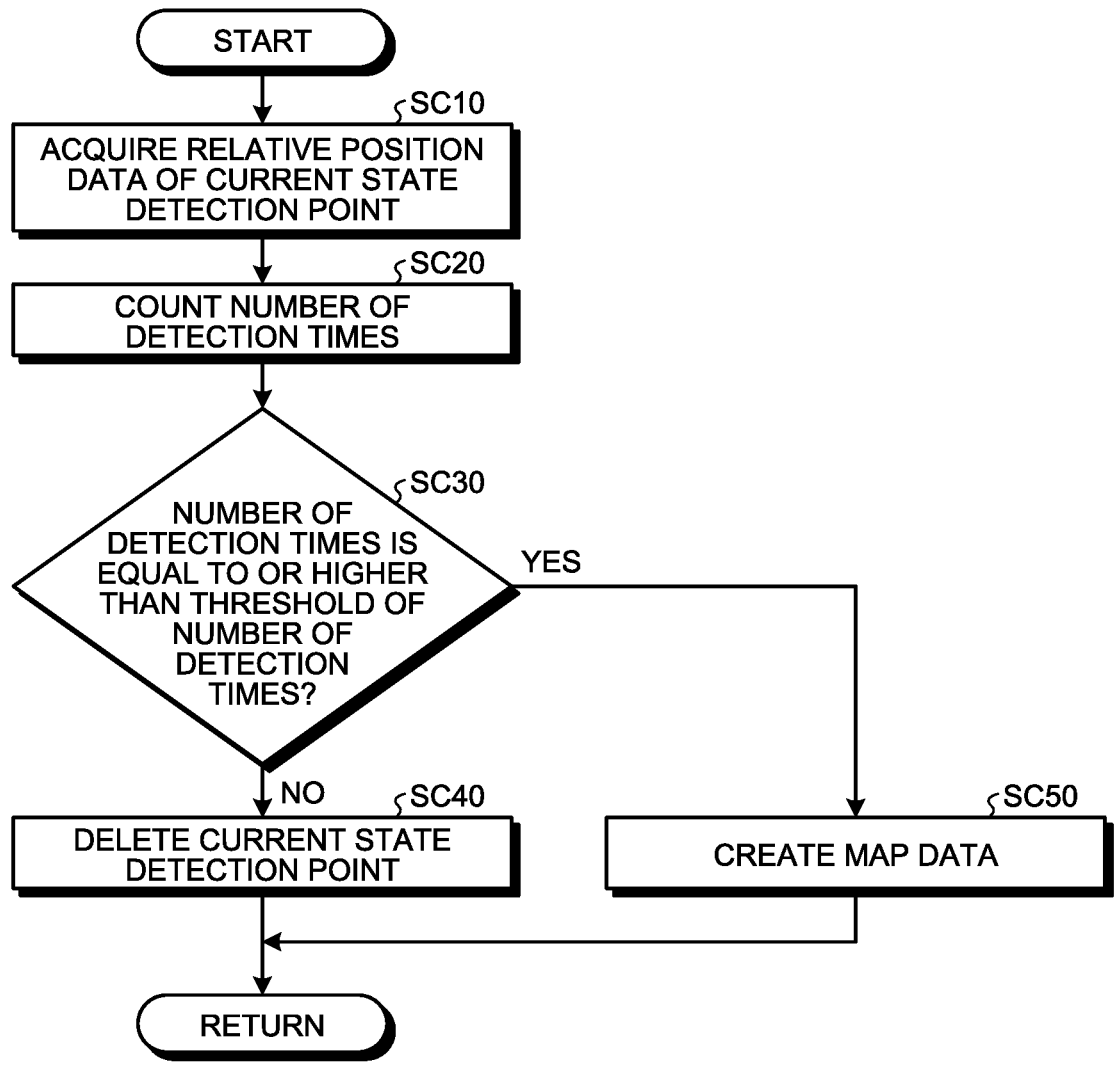
FIG. 16 is a flowchart illustrating a map data creating method according to the third embodiment.

Next, a map data creating method according to the present embodiment will be described. FIG. 16 is a flowchart exemplifying the map data creating method according to the present embodiment. The process illustrated in FIG. 16 is repeatedly executed at a defined cycle.

The work machine 2 travels on a traveling path HL. In travel of the work machine 2, the non-contact sensor 32 scans at least a part of an object (bank BK) in front of the work machine 2 with a detection wave. Detection data of the non-contact sensor 32 is output to a data processing device 10.

A relative position data acquisition unit 12 acquires relative position data of a current state detection point DPc (step SC10).

The counting processing unit 19 counts the number of detection times for each of a plurality of current state detection points DPc (step SC20).

The counting processing unit 19 determines whether or not the number of detection times of current state detection point DPc is equal to or higher than the threshold of the number of detection times (step SC30).

In step SC30, if it is determined that the number of detection times is not equal to or higher than the threshold of the number of detection times (step SC30: No), the map data creation unit 13 deletes a current state detection point DPc at which the number of detection times has been determined to be lower than the threshold of the number of detection times from map data (step SC40).

In step SC30, if it is determined that the number of detection times is equal to or higher than the threshold of the number of detection times (step SC30: Yes), the map data creation unit 13 creates map data using a current state detection point DPc at which the number of detection times is equal to or higher than the threshold of the number of detection times (step SC50).

As described above, according to the present embodiment, the map data creation unit 13 creates map data using a current state detection point DPc at which the number of detection times is equal to or higher than the threshold of the number of detection times, and does not create map data using a current state detection point DPc at which the number of detection times is lower than the threshold of the number of detection times. A current state detection point DPc detected when the work machine 2 passes the road surface condition change position CP and the attitude of the work machine 2 suddenly changes can be regarded as noise. A current state detection point DPc regarded as noise is deleted without contributing to creation of map data. As a result, inclusion of noise in map data is suppressed when the map data is created.

Other Embodiments

Note that in the above-described embodiments, map data created by the map data creation unit 13 may be displayed on a display device. The display device may be disposed in a cab of the work machine 2. The display device may be disposed in the control facility 5. The display device may change a display form of a grid forming map data on the basis of a matching condition. For example, the display device may display a current state detection point PDc that matches an existing detection point DPe, described in the above-described first embodiment, and a current state detection point PDc that does not match the existing detection point DPe in different colors or densities. The display device may display a current state detection point PDc at which the number of detection times is equal to or higher than the threshold of the number of detection times, described in the above-described second and third embodiments, and a current state detection point PDc at which the number of detection times is equal to or lower than the threshold of the number of detection times in different colors or densities.

Note that in the above-described embodiments, map data created by the data processing device 10 mounted on each of a plurality of the work machines 2 may be transmitted to the management device 3. The management device 3 may integrate a plurality of pieces of map data created in the plurality of work machines 2. The management device 3 may distribute the integrated map data to each of the plurality of work machines 2. Each of the plurality of work machines 2 may travel on the basis of the distributed map data. At a work site such as a mine, each of the plurality of work machines 2 is highly likely to travel many times on the same traveling path HL. Therefore, the map data created by the data processing device 10 mounted on each of the plurality of work machines 2 and integrated by the management device 3 is highly likely to be highly accurate map data. Each of the plurality of work machines 2 can travel in a collation traveling mode on the basis of the integrated highly accurate map data.

Note that in the above-described embodiments, at least some of functions of the data processing device 10 may be provided in the management device 3, or at least some of functions of the management device 3 may be provided in at least one of the data processing device 10 and the travel control device 40. For example, in the above-described embodiments, the management device 3 may have functions of the map data creation unit 13, the map data storage unit 14, and the collation unit 15, and map data created by the management device 3 may be transmitted to the travel control device 40 of the work machine 2 via the communication system 4.

Note that in the above-described embodiments, at least one of the threshold of the matching ratio and the threshold of the number of detection times may be set by an administrator of the control facility 5. The administrator can arbitrarily set the threshold of the matching ratio and the threshold of the number of detection times.

REFERENCE SIGNS LIST

1 MANAGEMENT SYSTEM
2 WORK MACHINE
3 MANAGEMENT DEVICE
3A TRAVELING CONDITION GENERATION UNIT
3B COMMUNICATION UNIT
4 COMMUNICATION SYSTEM
5 CONTROL FACILITY
6 WIRELESS COMMUNICATION DEVICE
7 LOADER
8 CRUSHER
9 CONTROL SYSTEM
10 DATA PROCESSING DEVICE
11 ABSOLUTE POSITION DATA ACQUISITION UNIT
12 RELATIVE POSITION DATA ACQUISITION UNIT
13 MAP DATA CREATION UNIT
14 MAP DATA STORAGE UNIT
15 COLLATION UNIT
17 COLLATION POSITION DATA CALCULATION UNIT
18 DEFINED AREA SETTING UNIT
19 COUNTING PROCESSING UNIT
21 MAIN VEHICLE BODY
22 DUMP BODY
23 TRAVELING DEVICE
23A DRIVING DEVICE
23B BRAKING DEVICE
23C STEERING DEVICE
24 SPEED SENSOR
25 DIRECTION SENSOR
27 WHEEL
27F FRONT WHEEL
27R REAR WHEEL
28 WIRELESS COMMUNICATION DEVICE
31 POSITION SENSOR
32 NON-CONTACT SENSOR
40 TRAVEL CONTROL DEVICE
AR DETECTION RANGE
CA DEFINED AREA
CS TARGET TRAVELING COURSE
DP DETECTION POINT
DPc CURRENT STATE DETECTION POINT
DPe EXISTING DETECTION POINT
DPcc CURRENT STATE DETECTION POINT
DPcn CURRENT STATE DETECTION POINT
DPcf CURRENT STATE DETECTION POINT
DPcfx CURRENT STATE DETECTION POINT
HL TRAVELING PATH
IS INTERSECTION
PA WORK AREA
PA1 LOADING AREA
PA2 EARTH DISCHARGING AREA
PI POINT

The invention claimed is:

1. A work machine control system comprising:
a work machine;
a position sensor that detects a position of a work machine traveling on a traveling path;
a non-contact sensor that detects a position of an object around the work machine;
a map data creation unit that creates map data, which is a plurality of grids representing a surface of the object, on a basis of a detection point, which is defined by one grid which is binary data indicating an existence of the surface or a non-existence of the surface of the object and detection data of the position sensor, the detection point being detected by the non-contact sensor and satisfying a defined matching condition for the map data in a defined area containing grids indicating the existence of the surface of the object or non-existence of the surface of the object, the detection point includes an existing detection point forming the map data stored in a map data storage unit, and a current state detection point detected by the non-contact sensor;
the map data storage unit that stores the map data;
a defined area setting unit that sets a defined area completely around the work machine and moves the defined area in synchronization with the work machine while keeping a shape and a size of the defined area constant; and
a counting processing unit that counts a number of detection times at which the same current state detection point has been detected by a plurality of scans of the non-contact sensor in the defined area;
wherein the matching condition, for the map data in the defined area containing grids indicating the existence of the surface of the object or non-existence of the surface of the object, includes that a matching ratio between the existing detection points forming map data stored in the map data storage unit and the current state detection points forming map data is equal to or lower than a threshold of the matching ratio.

2. The work machine control system according to claim 1, wherein
the map data creation unit creates the map data using the current state detection point that does not match the existing detection point when the matching ratio is equal to or lower than the threshold of the matching ratio.

3. The work machine control system according to claim 1, wherein
the matching ratio includes a matching ratio between a plurality of the existing detection points forming the map data and a plurality of the current state detection points detected by one scan of the non-contact sensor.

4. The work machine control system according to claim 1, wherein
the detection point includes a plurality of current state detection points detected by a plurality of scans of the non-contact sensor, and
the matching condition includes that the number of detection times at which the same current state detection point has been detected is equal to or higher than a threshold of the number of detection times.

5. The work machine control system according to claim 4, wherein
the traveling path includes a tilt change position, and
the current state detection point includes a current state detection point of an object in front of the work machine traveling on the traveling path.

6. The work machine control system according to claim 4, wherein
the map data creation unit creates the map data using the current state detection point at which the number of detection times is equal to or higher than the threshold of the number of detection times.

7. The work machine control system according to claim 1, further comprising:
a collation position data calculation unit that collates detection data of the non-contact sensor with the map data created by the map data creation unit, and calculates collation position data indicating a collation position of the work machine.

8. The work machine control system according to claim 7, further comprising:
a travel control device that controls a traveling state of the work machine on a basis of the collation position data calculated by the collation position data calculation unit when detection accuracy of the position sensor decreases.

9. A work machine control method comprising:
providing a work machine;
detecting a position of the work machine traveling on a traveling path with a position sensor;
detecting a position of an object around the work machine with a non-contact sensor; and
creating map data, which is a plurality of grids representing a surface of the object, on a basis of a detection point, which is defined by one grid which is binary data indicating an existence of the surface or a non-existence of the surface of the object and detection data of the position sensor, the detection point being detected by the non-contact sensor and satisfying a defined matching condition for the map data in a defined area containing grids indicating the existence of the surface of the object or non-existence of the surface of the object, the detection point includes an existing detection point forming the map data stored in a map data storage unit, and a current state detection point detected by the non-contact sensor;
storing map data in the map data storage unit;
defining an area completely around the work machine and moving the defined area in synchronization with the work machine while keeping a shape and a size of the defined area constant; and
counting a number of detection times at which the same current state detection point has been detected by a plurality of scans of the non-contact sensor in the defined area;
wherein the matching condition, for the map data in the defined area containing grids indicating the existence of the surface of the object or non-existence of the surface of the object, includes that a matching ratio between the existing detection points forming map data stored in the map data storage unit and the current state detection points forming map data is equal to or lower than a threshold of the matching ratio.

* * * * *